US009984323B2

(12) United States Patent
Amir et al.

(10) Patent No.: US 9,984,323 B2
(45) Date of Patent: May 29, 2018

(54) COMPOSITIONAL PROTOTYPES FOR SCALABLE NEUROSYNAPTIC NETWORKS

(71) Applicant: International Business Machines Corporation, Armonk, NY (US)

(72) Inventors: Arnon Amir, Saratoga, CA (US); Pallab Datta, San Jose, CA (US); Dharmendra S. Modha, San Jose, CA (US); Benjamin G. Shaw, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 14/669,575

(22) Filed: Mar. 26, 2015

(65) Prior Publication Data
US 2016/0283840 A1    Sep. 29, 2016

(51) Int. Cl.
G06F 15/18    (2006.01)
G06N 3/00    (2006.01)
G06N 3/063    (2006.01)
G06N 3/04    (2006.01)
G06N 3/08    (2006.01)
G06N 3/10    (2006.01)

(52) U.S. Cl.
CPC .............. *G06N 3/063* (2013.01); *G06N 3/049* (2013.01); *G06N 3/082* (2013.01); *G06N 3/105* (2013.01)

(58) Field of Classification Search
None
See application file for complete search history.

(56) References Cited

U.S. PATENT DOCUMENTS

| 6,269,353 | B1 | 7/2001 | Sethi et al. |
| 6,463,438 | B1 | 10/2002 | Veltri |
| 6,622,135 | B1 | 9/2003 | Imbert De Tremiolles et al. |
| 6,990,444 | B2 * | 1/2006 | Hind ..................... G10L 21/06 |
| | | | 704/235 |
| 7,016,887 | B2 | 3/2006 | Stockfisch |
| 7,089,592 | B2 | 8/2006 | Adjaoute |
| 7,814,038 | B1 | 10/2010 | Repici |
| 7,904,398 | B1 | 3/2011 | Repici |
| 8,332,340 | B2 | 12/2012 | Snider |

(Continued)

FOREIGN PATENT DOCUMENTS

WO    2013043610 A1    3/2013

OTHER PUBLICATIONS

Cognitive Computing Building Block: A Versatile and Efficient Digital Neuron Model for Neurosynaptic Cores—2013 Cassidy et al.*

(Continued)

*Primary Examiner* — Kakali Chaki
*Assistant Examiner* — Ababacar Seck
(74) *Attorney, Agent, or Firm* — Sherman IP LLP; Kenneth L. Sherman; Hemavathy Perumal

(57) ABSTRACT

Embodiments of the invention provide a method comprising maintaining a library of one or more compositional prototypes. Each compositional prototype is associated with a neurosynaptic program. The method further comprises searching the library based on one or more search parameters. At least one compositional prototype satisfying the search parameters is selected. A neurosynaptic network is generated or extended by applying one or more rules associated with the selected compositional prototypes.

19 Claims, 20 Drawing Sheets

(56) References Cited

U.S. PATENT DOCUMENTS

| | | | |
|---|---|---|---|
| 8,429,107 B2 | 4/2013 | Denneau et al. | |
| 8,515,885 B2 | 8/2013 | Modha | |
| 8,712,941 B2 | 4/2014 | Izhikevich et al. | |
| 8,812,414 B2 | 8/2014 | Arthur et al. | |
| 8,868,477 B2 | 10/2014 | Esser | |
| 8,904,347 B2* | 12/2014 | Miloushev | G06F 8/24 717/105 |
| 8,909,576 B2 | 12/2014 | Akopyan | |
| 8,977,583 B2 | 3/2015 | Modha | |
| 8,990,130 B2 | 3/2015 | Alvarez-Icaza Rivera | |
| 8,996,430 B2 | 3/2015 | Modha | |
| 9,020,867 B2 | 4/2015 | Esser | |
| 9,105,091 B2 | 8/2015 | He et al. | |
| 9,165,242 B2 | 10/2015 | Park | |
| 9,412,063 B2 | 8/2016 | Appuswamy et al. | |
| 9,489,622 B2 | 11/2016 | Modha | |
| 9,524,462 B2 | 12/2016 | Esser et al. | |
| 9,563,841 B2 | 2/2017 | Alvarez-Icaza Rivera et al. | |
| 9,639,802 B2 | 5/2017 | Modha | |
| 9,665,822 B2 | 5/2017 | Esser et al. | |
| 9,697,461 B2 | 7/2017 | Modha | |
| 9,747,545 B2 | 8/2017 | Akopyan et al. | |
| 9,798,972 B2 | 10/2017 | Appuswamy et al. | |
| 9,818,058 B2 | 11/2017 | Arthur et al. | |
| 9,852,006 B2 | 12/2017 | Akopyan et al. | |
| 2008/0159528 A1* | 7/2008 | Feghali | G06F 9/3879 380/30 |
| 2009/0288067 A1* | 11/2009 | Nathan | G06F 8/34 717/114 |
| 2011/0004579 A1 | 1/2011 | Snider | |
| 2011/0106741 A1 | 5/2011 | Denneau et al. | |
| 2012/0016829 A1 | 1/2012 | Snider | |
| 2012/0017275 A1* | 1/2012 | Harmonen | H04L 63/1425 726/24 |
| 2012/0084241 A1 | 4/2012 | Friedman et al. | |
| 2012/0109864 A1* | 5/2012 | Modha | G06N 3/063 706/25 |
| 2013/0031040 A1 | 1/2013 | Modha | |
| 2013/0073484 A1 | 3/2013 | Izhikevich et al. | |
| 2013/0073496 A1 | 3/2013 | Szatmary et al. | |
| 2013/0218821 A1 | 8/2013 | Szatmary et al. | |
| 2013/0232430 A1 | 9/2013 | Reitan | |
| 2014/0019392 A1 | 1/2014 | Buibas | |
| 2014/0052679 A1 | 2/2014 | Sinyavskiy et al. | |
| 2014/0157235 A1* | 6/2014 | Bird | G06F 11/008 717/121 |
| 2014/0180987 A1 | 6/2014 | Arthur et al. | |
| 2014/0258199 A1* | 9/2014 | Modha | G06N 3/02 706/26 |
| 2014/0280075 A1* | 9/2014 | Huang | H04L 41/069 707/722 |
| 2015/0058268 A1* | 2/2015 | Modha | G06N 3/049 706/27 |

OTHER PUBLICATIONS

Compass: A scalable simulator foran architecture for Cognitive Computing—2012 Preissl et al.*
Cognitive Computing Programming Paradigm: A Corelet Languagefor Composing Networks of Neurosynaptic Cores—2013 Amir et al.*
A Digital Neurosynaptic Core Using Event-Driven QDI Circuits—2012 Imam et al.*
Towards a Compositional Approach to Model Transformation for Software Development Soichiro Hidaka, Zhenjiang Hu, Hiroyuki Kato, Keisuke Nakano.*
Cognitive Computing Systems: Algorithms and Applications for—2013Networks of Neurosynaptic Cores—2013 Steve K. Esser, Alexander Andreopoulos, Rathinakumar Appuswamy, Pallab Datta, Davis Barch, Arnon Amir, John Arthur, Andrew Cassidy, Myron Flickner, Paul Merolla, Shyamal Chandra, Nicola Basilico,Stefano Carpin, Tom Zimmerman, Frank Zee.*
The Library Scaling Problem and the Limits of Concrete Component Reuse—1994 Ted J. Biggerstaff—Microsoft Research.*
Cognitive Computing Commercialization: Boundary Objects for Communication—2013 Shaw et al.*
Rodriguez, A., et al., "Migrating Subarea Networks to an IP Infrastructure Using Enterprise Extender", IBM.COM/Redbooks, Aug. 2000, pp. 1-276, IBM, United States.
Corneil, D. et al., "Real-time inference in a VLSI spiking neural network", Proceedings of the 2012 International Symposium on Circuits and Systems (ISCAS), May 20-23, 2012, pp. 2425-2428, IEEE, United States.
Brette, R. et al., "Simulation of networks of spiking neurons: A review of tools and strategies", J. of Computational Neuroscience, Apr. 12, 2007, pp. 1-50, Springer Science, United States.
Djurfeldt, M., "The Connection-set Algebra—A Novel Formalism for the Representation of Connectivity Structure in Neuronal Network Models", Neuroinformatics, Mar. 23, 2012, pp. 287-304, vol. 10, Issue 3, Springer, United States.
Cassidy, A.S. et al., "Cognitive Computing Building Block: A Versatile and Efficient Digital Neuron Model for Neurosynaptic Cores", Proceedings of the 2013 International Joint Conference on Neural Networks, 2013, pp. 1-10, IEEE, United States.
Wendt, K. et al., GMPath—A Path Language for Navigation, Information Query and Modification of Data Graphs, Proceedings of the 2010 6th International Workshop Artificial Neural Networks and Intelligent Information Processing (ANNIP 2010), 2010, pp. 33-42, United States.
Ehrlich, M. et al., "A software framework for mapping neural networks to a wafer-scale neuromorphic hardware system", Proceedings of the 2010 Artificial Neural Networks and Intelligent Information Processing Conference, 2010, 1-10, United States.
Zoeter, O., "A new approximate inference method for spike and slab model: expectation propagation with a replication trick", Mar. 27, 2012, pp. 1-13, IP.com, United States.
Fox, G.C., et al., "Load Balancing by a Neural Network", Oct. 31, 1986, pp. 1-55, IP.com, United States.
Chakrabarti, D. et al., "Fully Automatic Cross-Associations", Proceedings of the 10th ACM SIGKDD International Conference on Knowledge discovery and data mining (KDD '04), Aug. 22, 2004, pp. 79-88, ACM, United States.
Amr, A., et al., "Cognitive Computing Programming Paradigm: A Corelet Language for Composing Networks of Neurosynaptic Cores," in International Joint Conference on Neural Networks (IJCNN), 2013, p. 1-10, IEEE, United States.
Arthur, J.V. et al., "Building Block of a Programmable Neuromorphic Substrate: A Digital Neurosynaptic Core", Proceedings of the 2012 World Congress on Computational Intelligence (WCCI), Jun. 10-15, 2012, IEEE, United States.
Booton, J., "After Watson, IBM Looks to 'Build Brain in a Box'", FOXBusiness, Aug. 22, 2013, pp. 1-2, United States.
Esser, S.K. et al., "Cognitive Computing Systems: Algorithms and Applications for Networks for Neurosynaptic Cores", 2013, pp. 1-10, IBM, United States.
Gleeson, P. et al., "NeuroML: A Language for Describing Data Driven Models of Neurons and Networks with a High Degree of Biological Detail", Jun. 17, 2010, PLOS Computational Biology, pp. 1-19, vol. 6, Issue 6, United States.
Green, T.R.G. et al., "Usability Analysis of Visual Programming Environments: a 'cognitive dimensions' framework," Journal of Visual Languages and Computing, Jun. 1996, pp. 131-174, v. 7, issue 2, Elsevier, United States.
IBM, "IBM creates new foundation to program SyNAPSE chips inspired by human brain", Phys. Org., Aug. 8, 2013, pp. 1-3, IBM, United States.
International Search Report and Written Opinion dated Oct. 8, 2014 for International Application No. PCT/EP2014/051215 from European Patent Office, pp. 1-15, Rijswijk, Netherlands.
Munipalli, S.K., "An FPGA Implementation of a High Performance AER Packet Network", Jan. 1, 2013, Scholar Dissertations and Theses, pp. 1-105, Portland State University, PDXScholar, United States.
Nengo, "Nengo Neural Simulator", http://www.nengo.ca/, downloaded Feb. 13, 2015, p. 1-2, United States.

(56) References Cited

OTHER PUBLICATIONS

Neuflow, "An embedded eye, in your hands", http://www.neuflow.org/, Feb. 6, 2012, p. 1-3, downloaded Feb. 13, 2015, United States.
Preissl, R. et al., "Compass: A scalable simulator for an architecture for Cognitive Computing", Proceedings of the 2012 International Conference for High Performance Computing, Networking, Storage and Analysis (SC), Nov. 10-16, 2012, pp. 1-11, IEEE, United States.
List of IBM Patents or Patent Applications Treated as Related Form; U.S. Appl. No. 14/528,885, filed Oct. 30, 2014; U.S. Appl. No. 14/662,096, filed Mar. 18, 2015; U.S. Appl. No. 14/662,115, filed Mar. 18, 2015; U.S. Appl. No. 13/791,505, filed Mar. 8, 2013; U.S. Appl. No. 14/626,677, filed Feb. 19, 2015.
International Search Report and Written Opinion dated Apr. 29, 2016 for International Application No. PCT/EP2016/051334 from European Patent Office, pp. 1-12, Rijswijk, Netherlands.
Plesser, H.E. et al., "Efficient Parallel Simulation of Large-Scale Neuronal Networks on Clusters of Multiprocessor Computers", Proceedings in the 13th International Euro-Par Conference, Lecture Notes in Computer Science, Aug. 28, 2007, pp. 672-681, vol. 4641, France.
Djurfeldt, M., "Efficient generation of connectivity in neuronal networks from simulator-independent descriptions", Frontiers in Neuroinformatics, Apr. 22, 2014, pp. 1-12, vol. 8, Article 43, United States.
Minkovich,K. et al., "Programming Time-Multiplexed Reconfigurable Hardware Using a Scalable Neuromporhic Compiler", Proceedings of the IEEE Transaction on Neural Networks and Learning Systems, Jun. 212, pp. 889-900, vol. 23, No. 6, United States.
Galluppi, F. et al., "A Hierachical Configuration System for a Massively Parallel Hardware Platform", Proceedings of the 9th Conference on Computing Frontiers (CF'12), May 15, 2012, pp. 183-192, United States.
Wendt, K. et al., "A graph theoretical approach for a multistep mapping software for the FACETS project", Proceedings of the 2nd WSEAS International Conference on Computer Engineering and Applications (CEA'08), Jan. 25, 2008, pp. 189-194, Mexico.
Eichner, H. et al., "Neural simulations on multi-core architectures", Frontiers in Neuroinformatics, Jul. 9, 2009, pp. 1-15, vol. 3, Article 21, United States.
Extended European Search Report dated Feb. 8, 2017 for European Application No. 16152389.9 from European Patent Office, pp. 1-13, Munich, Germany.
Liiv, I., "Seriation and Matrix Reordering Methods: An Historical Overview", Statistical Analysis and Data Mining, Mar. 11, 2010, pp. 70-91, vol. 3, No. 2, Wiley InterScience, United States.
Kumazawa, I. et al., "A Learning Scheme for Bipartite Recurrent Networks and Its Performance", Proceedings in the 1993 First New Zealand International Two-Stream Conference on Artificial Neural Networks and Expert, Systems, Nov. 24-26, 1993, pp. 34-37, IEEE, United States.
Zhang, C. et al., "A Saturation Binary Neural Network for Bipartite Subgraph Problem", Proceeding in the ICIC'11 Proceedings of the 7th International Conference on Intelligent Computing: Bio-Inspired Computing and Applications, 2012, pp. 64-70, vol. 6840, Springer, Berlin.
List of IBM Patents or Applications Treated as Related.

Sporns, O. et al. "Organization, Development and Function of Complex Brain Networks", Trends in Cognitive Sciences, Sep. 2004, pp. 418-425, vol. 8, No. 9, Elsevier, United States.
Rempis, C. W. et al., "Search Space Restriction of Neuro-evolution through Constrained Modularization of Neural Networks", Proceedings of the 6th International Workshop on Artificial Neural Networks and Intelligent Information Processing (ANNIIP), Jun. 2010. pp. 13-22, SciTePress, Madeira, Portugal.
Miller, B. et al., "Embedding-Based Placement of Processing Element Networks on FPGAs for Physical Model Simulation", Proceedings of the ACM/SIGDA International Symposium on Field programmable gate arrays (FPGA '13), Feb. 11-13, 2013, pp. 181-190, ACM, United States.
Wang, R. M. et al. "A Mixed-Signal Implementation of a Polychronous Spiking Neural Network with Delay Adaptation." Frontiers in Neuroscience, Mar. 18, 2014, pp. 1-16, vol. 8, Art. 51, PMC, United States.
Misra, J. et al., "Artificial Neural Networks in Hardware: A Survey of Two Decades of Progress", Neurocomputing, Dec. 2010, pp. 239-255, vol. 74, No. 1, Elsevier, United States.
Wang, F. et al., "A Hierarchical Neural Network Approach to the Development of a Library of Neural Models for Microwave Design", IEEE Transactions on Microwave Theory and Techniques, Dec. 1998, pp. 2391-2403, vol. 46, No. 12, IEEE Press, United States.
Bruderie, D. et al., "A comprehensive workflow for general-purpose neural modeling with highly configurable neuromorphic hardware system", Biological Cybernetics, Nov. 10, 2011, pp. 263-296, vol. 104, Springer-Verlag, Berlin, Germany.
Sporns, O. et al. "Theoretical neuroanatomy: relating anatomical and functional connectivity in graphs and cortical connection matrices", Cerebral Cortex, Feb. 1, 2000, pp. 127-141, vol. 10, No. 2, Oxford University Press, United Kingdom.
Siirtola, H. et al., "Constructing and reconstructing the reorderable matrix", Information Visualization, Feb. 3, 2005, pp. 32-48, vol. 4, No. 1, Palgrave Journals, United Kingdom.
Gemulla, R. et al., "Large-scale matrix factorization with distributed stochastic gradient descent", Proceedings of the 17th ACM SIGKDD International Conference on Knowledge Discovery and Data Mining, Mar. 16, 2011, pp. 1-49, ACM, United States.
Shukla, R. et al., "Evaluating hopfield-network-based linear solvers for hardware constrained neural substrates", Proceeding from the 2017 International Joint Conference on Neural Networkds (IJCNN), 2017, pp. 3938-3945, IEEE, United States.
Such, F.P. et al., "Robust Spatial Filtering With Graph Convolutional Neural Networks", IEEE Journal of Selected Topics in Signal Procesing, Sep. 2017, pp. 884-896, vol. 11, No. 6, IEEE, United States.
Diehl, P.U. et al., "Conversion of Artificial Recurrent Neural Networks to Spiking Neural Networks for Low-power Neuromorphic Hardware", Proceedings from the 2016 IEEE International Conference on Rebooting Computing (ICRC), 2016, pp. 1-8, IEEE, United States.
Wang, H. et al. "Locality-Preserved Maximum Information Projection", IEEE Transactions on Neural Networks, Apr. 2008, pp. 571-585, vol. 19, No. 4, IEEE, United States.
List of IBM Patents or Patent Applications Treated as Related.
Chinese Office Action dated Mar. 13, 2018 for Chinese Application No. 201610024915.5 from China Patent Office, pp. 1-12, Beijing City, China.

\* cited by examiner

12

| $SW_0$ | $SW_2$ | $SW_2$ | $SW_3$ |
|---|---|---|---|
| $SW_1$ | $SW_0$ | $SW_4$ | $SW_2$ |
| $SW_1$ | $SW_3$ | $SW_0$ | $SW_1$ |
| $SW_4$ | $SW_1$ | $SW_2$ | $SW_0$ |

FIG. 14

COMPOSITIONAL PROTOTYPES FOR SCALABLE NEUROSYNAPTIC NETWORKS

This invention was made with Government support under HR0011-09-C-0002 awarded by Defense Advanced Research Projects Agency (DARPA). The Government has certain rights in this invention.

BACKGROUND

The present invention relates to neuromorphic and neurosynaptic computation, and in particular, compositional prototypes for scalable neurosynaptic networks.

Neuromorphic and neurosynaptic computation, also referred to as artificial neural networks, are computational systems that are inspired by biological brains. For example, neuromorphic and neurosynaptic computation may comprise various electronic circuits and/or create connections between processing elements that are inspired by neurons of a biological brain.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance may change with time as a function of the relative spike times of pre-synaptic and post-synaptic neurons.

BRIEF SUMMARY

One embodiment of the invention provides a method comprising maintaining a library of one or more compositional prototypes. Each compositional prototype is associated with a neurosynaptic program. The method further comprises searching the library based on one or more search parameters. At least one compositional prototype satisfying the search parameters is selected. A neuromorphic network is generated or extended by applying one or more rules associated with the selected compositional prototypes.

Another embodiment of the invention provides a method comprising analyzing one or more model files. Each model file includes information relating to a neurosynaptic core. The method further comprises identifying one or more unique core patterns in the model files, and assigning each unique core pattern identified with a corresponding unique identifier. For each unique core pattern identified, each instance of the unique core pattern in the model files is located based on repetitions of a corresponding unique identifier for the unique core pattern, and each instance located with a compositional prototype corresponding to the unique core pattern is replaced.

Another embodiment of the invention provides a method comprising providing a programming environment for corelet composition. The method further comprises recording, utilizing the programming environment, one or more user actions associated with corelet composition. For each user action recorded, a corresponding database record including metadata related to the user action is maintained, and database records with similar metadata are clustered to identify one or more patterns related to corelet composition.

These and other features, aspects, and advantages of the present invention will become understood with reference to the following description, appended claims, and accompanying figures.

BRIEF DESCRIPTION OF THE DRAWINGS

FIG. 14 illustrates an example crossbar, in accordance with an embodiment of the invention;

DETAILED DESCRIPTION

Figure 1:
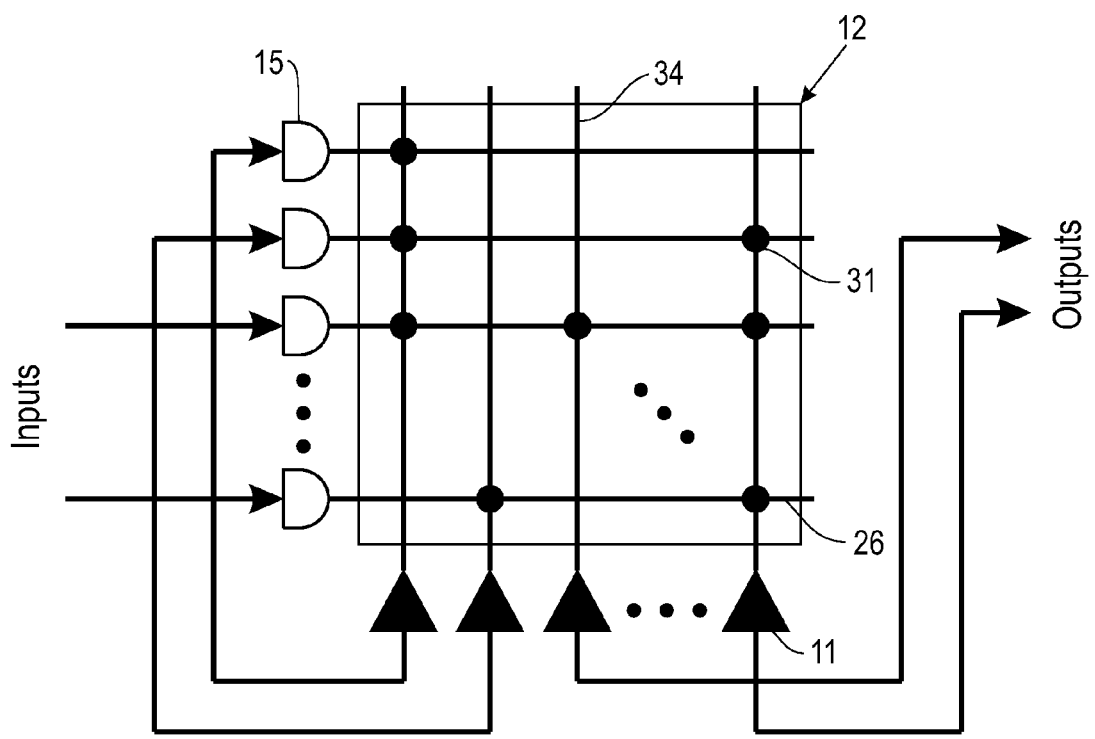
FIG. 1 illustrates an example neuromorphic core circuit, in accordance with an embodiment of the invention.

The present invention relates to compositional prototypes for scalable neurosynaptic networks. One embodiment of the invention provides a method comprising maintaining a library of one or more compositional prototypes. Each compositional prototype is associated with a neurosynaptic program. The method further comprises searching the library based on one or more search parameters. At least one compositional prototype satisfying the search parameters is selected. A neuromorphic network is generated or extended by applying one or more rules associated with the selected compositional prototypes.

Another embodiment of the invention provides a method comprising analyzing one or more model files. Each model file includes information relating to a neurosynaptic core. The method further comprises identifying one or more unique core patterns in the model files, and assigning each unique core pattern identified with a corresponding unique identifier. For each unique core pattern identified, each instance of the unique core pattern in the model files is located based on repetitions of a corresponding unique identifier for the unique core pattern, and each instance located with a compositional prototype corresponding to the unique core pattern is replaced.

Another embodiment of the invention provides a method comprising providing a programming environment for corelet composition. The method further comprises recording, utilizing the programming environment, one or more user actions associated with corelet composition. For each user action recorded, a corresponding database record including metadata related to the user action is maintained, and database records with similar metadata are clustered to identify one or more patterns related to corelet composition.

In this specification, the terms neuromorphic and neurosynaptic are used interchangeably.

The term electronic neuron as used herein represents an architecture that creates connections between processing elements that are inspired by neurons of a biological brain. Although certain illustrative embodiments of the invention are described herein using electronic neurons comprising electronic circuits, the present invention is not limited to electronic circuits. A neuromorphic computation according to embodiments of the invention can be implemented as a neuromorphic and neurosynaptic architecture comprising circuitry, and additionally as a computer simulation. Indeed, embodiments of the invention can take the form of an entirely hardware embodiment, an entirely software embodiment or an embodiment containing both hardware and software elements.

The term neurosynaptic program as used herein represents a neurosynaptic network. A neurosynaptic program constitutes information relating to the following: neuronal properties and dynamics (e.g., a threshold parameter, a leak parameter, a delay parameter, a reset parameter, etc.) that determine an electronic neuron's response to input spikes, synaptic connections of the neuron (e.g., synaptic connections made via a synaptic crossbar), axon properties (e.g., axon types), and one or more destinations (e.g., target axons) to which the neuron's output spike should be delivered.

The term neurosynaptic network as used herein represents an instantiation of a neurosynaptic program. A neurosynaptic network may be instantiated in hardware, in simulation or both. For example, a neurosynaptic program may give rise to one or more instances of a neurosynaptic network, wherein the instances may reside on a single core, multiple cores, or multiple chips.

The term neuromorphic core circuit as used herein represents an example neurosynaptic network described by a neurosynaptic program.

Embodiments of the invention facilitate composition of neurosynaptic programs. Embodiments of the invention further facilitate composition of abstractions of neurosynaptic programs. One embodiment of software provides an abstraction of a neurosynaptic program.

The terms corelet and Corelet Programming Language as used herein represent preferred embodiments of software that provide abstraction of neurosynaptic programs. A composition of neurosynaptic programs may be created by composing corelets.

The term model file as used herein represents a machine readable representation (e.g., JSON, binary, etc.) of a neurosynaptic program, a neurosynaptic network, or both.

FIG. 1 illustrates an example neuromorphic core circuit 10, in accordance with an embodiment of the invention. The core circuit 10 comprises a plurality of electronic neurons ("neurons") 11 and a plurality of electronic incoming axons ("axons") 15. The neurons 11 and the axons 15 are interconnected via an m x n crossbar 12 comprising multiple electronic synapse devices ("synapses") 31, wherein m and n are integers greater than or equal to one. The crossbar 12 further includes multiple rows/axon paths 26 and multiple columns/dendrite paths 34. Each axon 15 is connected to a corresponding axon path 26 of the crossbar 12. Each neuron 11 is connected to a corresponding dendrite path 34 of the crossbar 12. Each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each neuron 11 receives firing events (e.g., input spikes) via interconnected axons 15. Each neuron 11 has a corresponding neuronal state and a configurable set of neuronal properties and/or dynamics. Based on received firing events, its current neuronal state and its neuronal properties and dynamics, a neuron may generate a firing event (e.g., an output spike) according to a neuronal activation function. An example neuronal activation function may be leaky integrate-and-fire.

In this specification, let the term target destination denote a destination for a firing event. Each firing event has a corresponding target destination to which the firing event is delivered. Let the term target axon denote an axon 15 that is a target destination. A firing event generated by a neuron 11 propagates to a target axon 15, wherein the target axon 15 may reside in the core circuit 10 as the neuron 11 or in a different core circuit 10 included in a neuromorphic core-based architecture comprising multiple interconnected core circuits 10.

One or more axons 15 may receive external inputs, such as sensory inputs from one or more sensory transducers configured to provide sensory input. In one embodiment, each sensory input is propagated to a target axon 15 as a firing event. One or more neurons 11 may generate firing events that are provided as external outputs. In one embodiment, the external outputs represent motor outputs provided to one or more end effectors or actuators (e.g., a motor control system configured to generate motor output in response to firing events generated by one or more neurons 11). An external two-way communication environment may supply sensory inputs to the core circuit 10 and consume motor outputs from the core circuit 10. In another embodiment, the external outputs represent signals provided to one or more software modules, visualizations or displays (e.g., signals indicating presence of particular classes in a field of view, or a particular pattern across a set of inputs).

The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using one-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10 (e.g., a neuromorphic core-based architecture comprising multiple interconnected core circuits 10).

Figure 2:
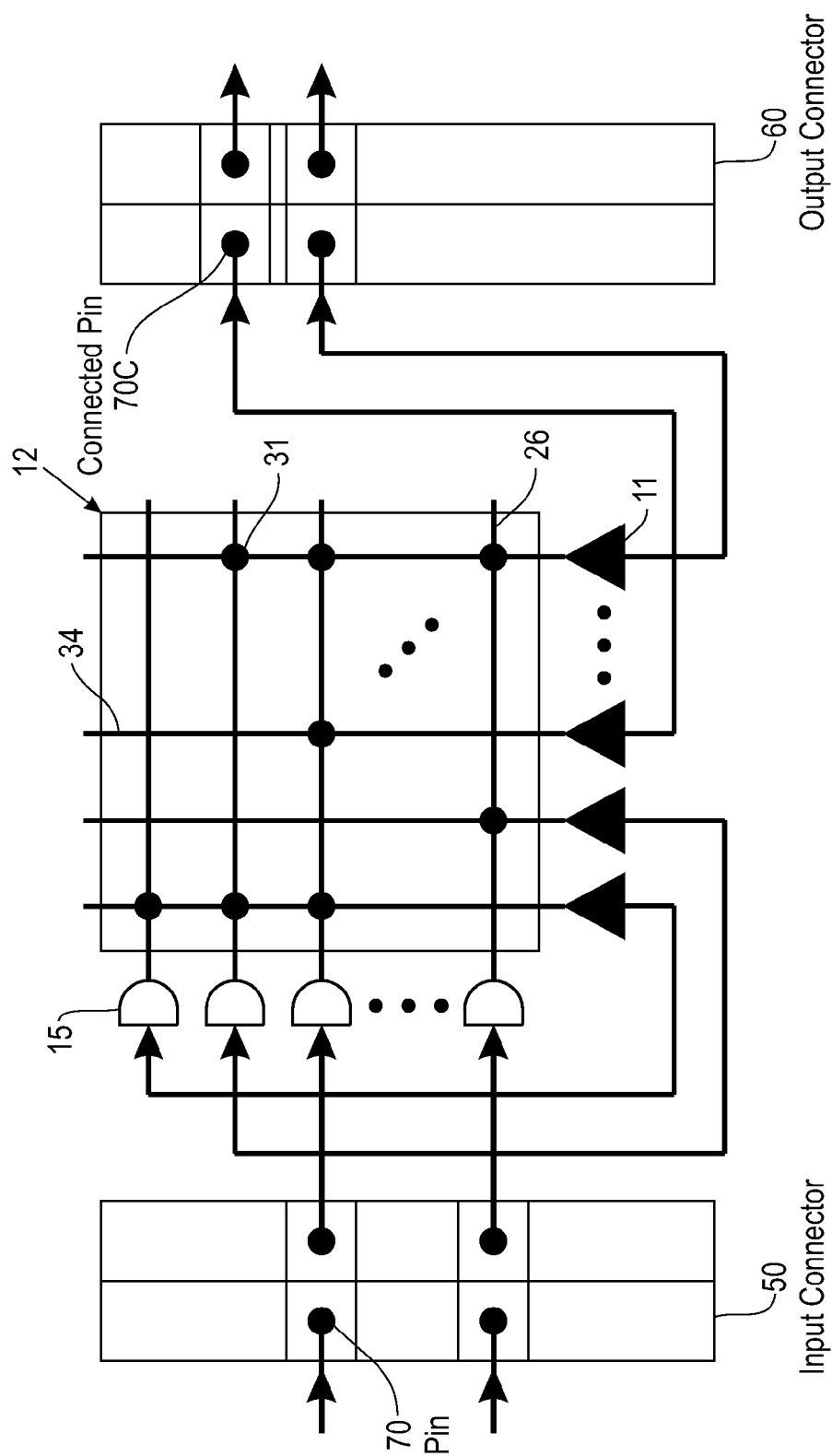
FIG. 2 illustrates an example core circuit with an input connector and an output connector, in accordance with an embodiment of the invention.
Figure 8:
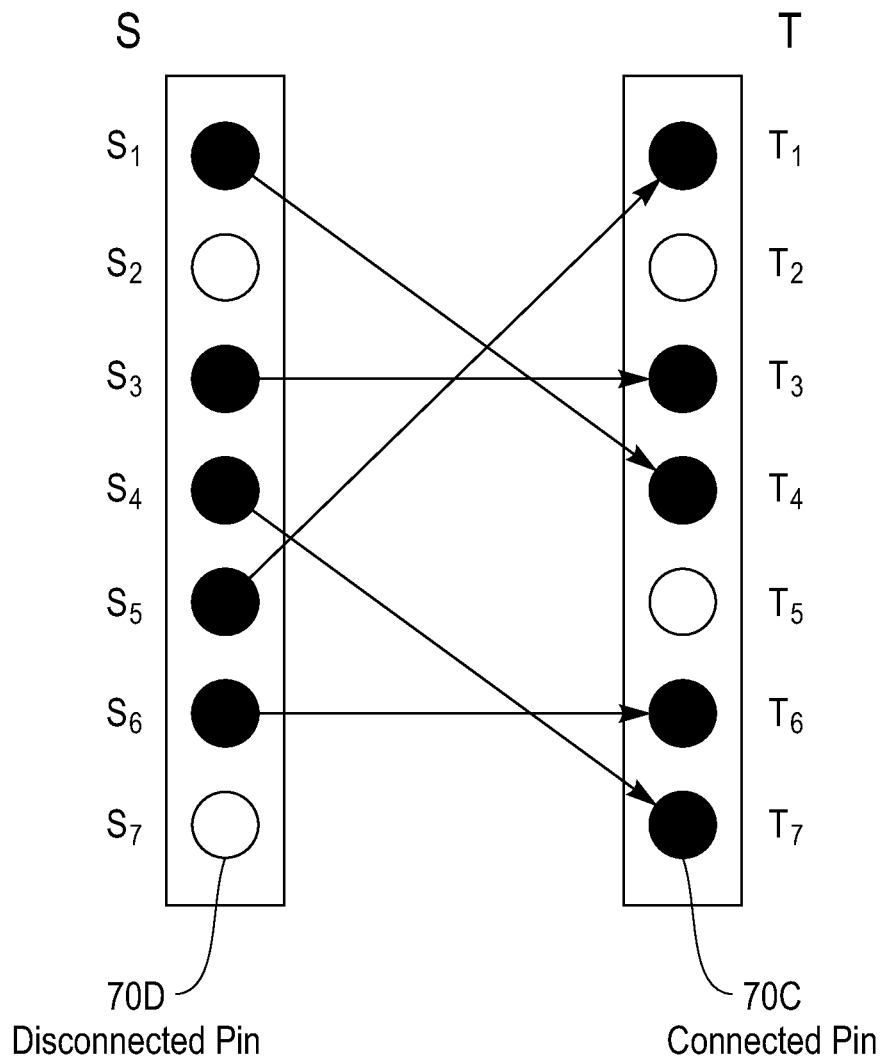
FIG. 8 illustrates an example network connectivity permutation, in accordance with an embodiment of the invention.

FIG. 2 illustrates an example core circuit 10 with an input connector 50 and an output connector 60, in accordance with an embodiment of the invention. The core circuit 10 receives external inputs, such as sensory inputs, via one or more input connectors 50. Each input connector 50 includes one or more pins 70. A pin 70 may be a connected pin 70C or a disconnected pin 70D (FIG. 8). An axon 15 receives external input via a connected pin 70C of an input connector 50.

The core circuit 10 provides external outputs, such as motor outputs, via one or more output connectors 60. Each output connector 60 includes one or more pins 70. A spike/firing event generated by a neuron 11 is provided as external output via a connected pin 70C of an output connector 60.

Figure 3:
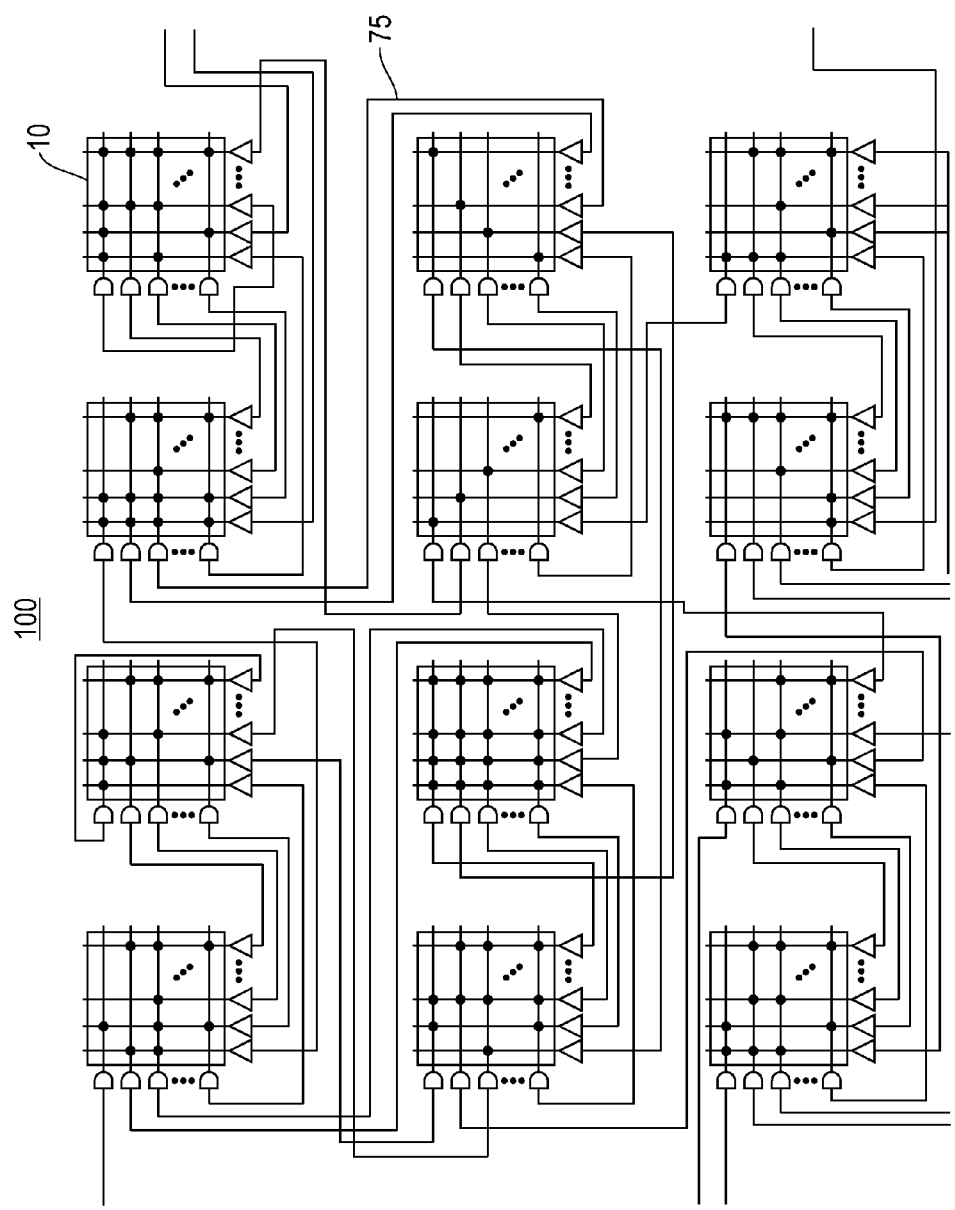
FIG. 3 illustrates an example neuromorphic core-based architecture including multiple interconnected core circuits, in accordance with an embodiment of the invention.

FIG. 3 illustrates an example neuromorphic core-based architecture 100 including multiple interconnected core circuits 10, in accordance with an embodiment of the invention. Each core circuit 10 utilizes an interconnect network 75 to pass along neuronal firing events to other core circuits 10.

Figure 4:
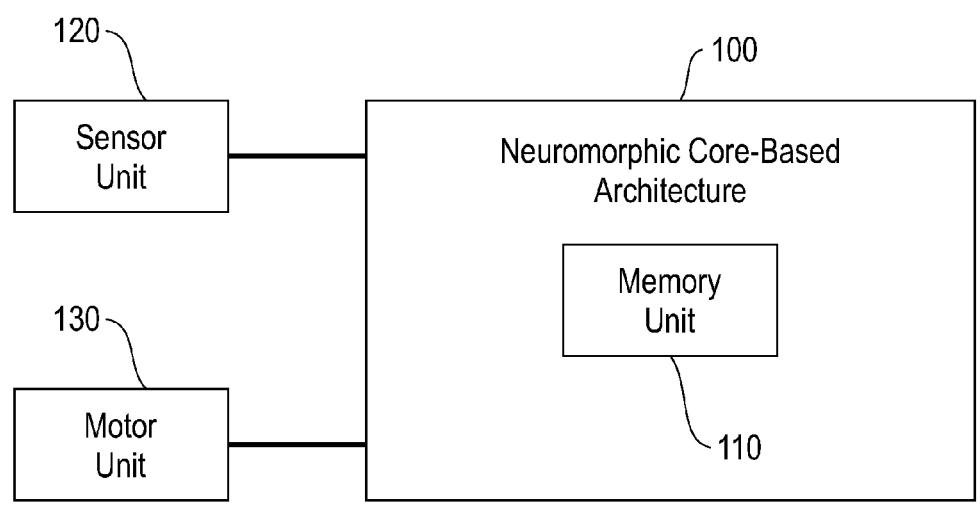
FIG. 4 illustrates a high-level block diagram of the neuromorphic core-based architecture in FIG. 3, in accordance with an embodiment of the invention.

FIG. 4 illustrates a high-level block diagram of the neuromorphic core-based architecture 100 in FIG. 3, in accordance with an embodiment of an invention. In one embodiment, the neuromorphic core-based architecture 100 includes at least one memory unit 110. As stated above, a corelet represents a preferred embodiment of software that provides an abstraction of a neurosynaptic program. A corelet may be interpreted or compiled to yield constituent elements of a neurosynaptic program (i.e., neuronal properties and dynamics, synaptic connections, axon properties and destinations, etc.) that are loaded into one or more memory units 110 of the neuromorphic core-based architecture 100.

Figure 5:
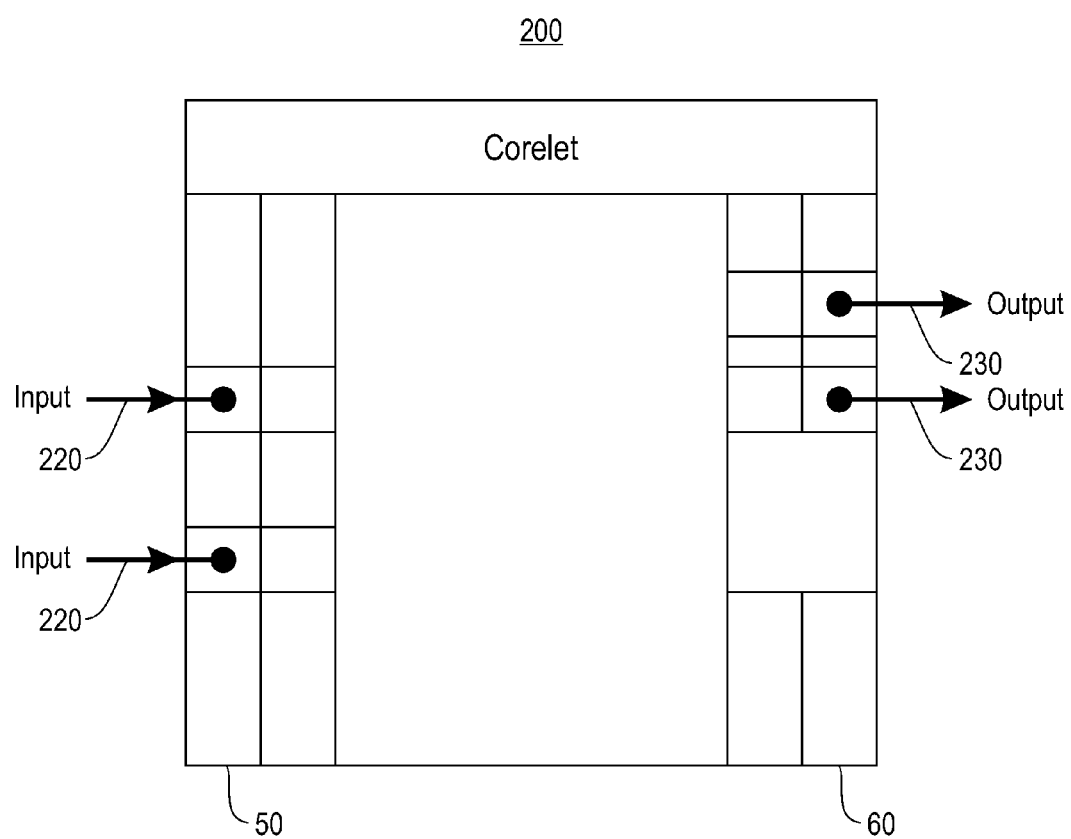
FIG. 5 illustrates an example corelet, in accordance with an embodiment of the invention.

FIG. 5 illustrates an example corelet 200, in accordance with an embodiment of the invention. In one embodiment, a corelet 200 is a software abstraction of a neurosynaptic program describing a neurosynaptic network including one or more core circuits 10. The corelet 200 encapsulates all intra-network connectivity and all intra-core physiology (e.g., neuronal properties and dynamics), and only exposes external inputs and external outputs to and from the network. For example, the corelet 200 may provide a structural description of one or more core circuits 10 of the network.

In one embodiment, a corelet 200 is a static configuration file for programming a portion (i.e., a fraction) of a core circuit 10, a core circuit 10, or at least two corelets 200 representing multiple interconnected core circuits 10. For example, a corelet 200 includes information relating to inputs 220 received by the corelet 200, outputs 230 provided by the corelet 200, function of the corelet 200, and/or cost of utilizing the corelet 200 to program a portion of a neural network circuit.

Corelets 200 are applicable to different types of neuromorphic core circuits. In one embodiment, a corelet 200 is a static configuration file for programming a portion (i.e., a fraction) of a core circuit 10 or a core circuit 10. Corelets 200 may also be composed in a hierarchical fashion, such that a corelet 200 may be used to program two or more corelets 200 representing multiple interconnected core circuits 10. A corelet 200 may program the neuronal activity of a core circuit 10 of the neural network circuit 100. Other examples of activities a corelet 200 may program a core circuit 10 to perform include edge detection in image/video, motion history tracking in video, object classification, sense-response in a robotic environment, and sound filtering.

In one embodiment, a corelet 200 may comprise C constituent units ("constituent sub-corelets"), wherein C is an integer greater than or equal to one. Each sub-corelet defines one of the following: a portion (i.e., a fraction) of a core circuit 10, a core circuit 10, multiple core circuits or a corelet 200 that in turn defines a fraction, one or multiple interconnected core circuits 10.

The corelet 200 receives one or more inputs 220 via an input connector 50. Each input 220 may represent a firing event from another corelet 200 or a sensory input from a sensor unit 120 (FIG. 4). In one embodiment, the input connector 50 includes an input mapping table that maintains routing information for each input 220 received by the corelet 200. Based on the input mapping table, each received input 220 is mapped either to a target axon 15 of a core circuit 10 or to an input connector 50 of a sub-corelet within the corelet 200. Similarly, each input received by a sub-corelet of the corelet 200 is in turn mapped to a target axon 15 of a core circuit 10 included in the sub-corelet or to one of its sub-corelets.

In another embodiment, a corelet 200 may not have any constituent sub-corelets. For example, a corelet 200 that spans multiple interconnected core circuits 10 may not have any constituent sub-corelets.

Each output 230 may represent a firing event generated by a neuron 11. In one embodiment, each output provided by a sub-corelet of the corelet 200 is mapped to one of the following: a target axon 15 of a core circuit 10, an input connector 50 of a sub-corelet within the corelet 200, or an output connector 60 of the corelet 200.

The corelet 200 provides one or more outputs 230. Each output 230 may be routed to another corelet 200 or a motor unit 130 (FIG. 4) via an output connector 60. In one embodiment, the output connector 60 includes an output mapping table that maintains routing information for each output 230 provided by the corelet 200. Based on the output mapping table, each output 230 is mapped to one of the following: another corelet 200, or a motor unit 130. An output of a sub-corelet may be mapped to an output of the corelet 200 (see, for example, FIG. 6). Using input connectors 50 and output connectors 60 with mapping tables facilitates hierarchical connectivity mapping in hierarchical corelet composition at any number of hierarchical levels.

Figure 6:
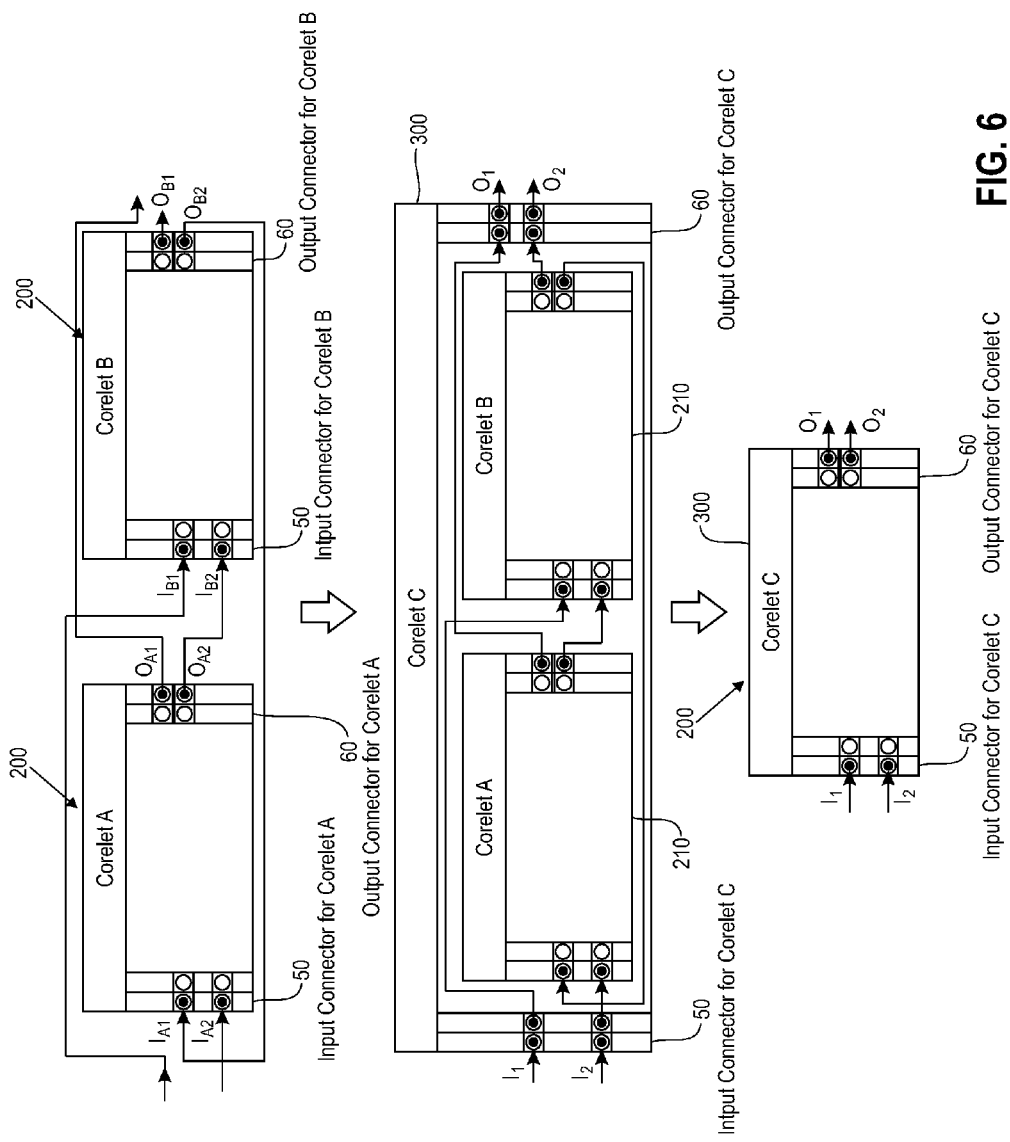
FIG. 6 illustrates an example complex corelet, in accordance with an embodiment of the invention.

FIG. 6 illustrates an example complex corelet 300, in accordance with an embodiment of the invention. A complex corelet 300 is a corelet 200 having a composition of multiple sub-corelets 210. Corelet C as shown in FIG. 6 is an example complex corelet 300 composed of two sub-corelets 210. Specifically, Corelet C is a composition of a first sub-corelet Corelet A and a second sub-corelet Corelet B. The first sub-corelet Corelet A receives a first input $I_{A1}$ and a second input $I_{A2}$ via a corresponding input connector 50 (Input Connector for Corelet A), and provides a first output $O_{A1}$ and a second output $O_{A2}$ via a corresponding output connector 60 (Output Connector for Corelet A). The second sub-corelet Corelet B receives a first input $I_{B1}$ and a second input $I_{B2}$ via a corresponding input connector 50 (Input Connector for Corelet B), and provides a first output $O_{B1}$ and a second output $O_{B2}$ via a corresponding output connector 60 (Output Connector for Corelet B).

The complex corelet 300 receives one or more inputs 220 via a corresponding input connector 50. Each input 220 may represent an output from another corelet 200 or a sensory input from a sensor unit 120. In one embodiment, the input connector 50 comprises an input mapping table that maintains routing information for each input 220 received by the complex corelet 200. Based on the input mapping table, each received input 220 is mapped as input to an input connector 50 of a sub-corelet 210 of the complex corelet 300. For example, as shown in FIG. 6, a first input $I_1$ received by Corelet C is mapped to the input connector 50 of the second sub-corelet Corelet B as the first input $I_{B1}$. A second input $I_2$ received by Corelet C is mapped to the input connector 50 of the first sub-corelet Corelet A as the second input $I_{A2}$.

The complex corelet 300 provides one or more outputs 230 via a corresponding output connector 60. Each output 230 represents an output from a sub-corelet 210 of the complex corelet 300. In one embodiment, the output connector 60 includes an output mapping table that maintains routing information for each output 230 provided by the complex corelet 300. Based on the output mapping table, each output 230 is mapped as an input to an input connector 50 of another corelet 200, or as an external output (e.g., as a motor output provided to an external motor unit 130, or a signal provided to a software module, visualization or display). For example, as shown in FIG. 6, the Corelet C provides a first output $O_1$ and a second output $O_2$ via an output connector 60 of Corelet C.

If the sub-corelets Corelet A and Corelet B are abstractions of a first core circuit 10 and a second core circuit 10, Corelet C represents an abstraction of two interconnected core circuits 10.

Figure 7:
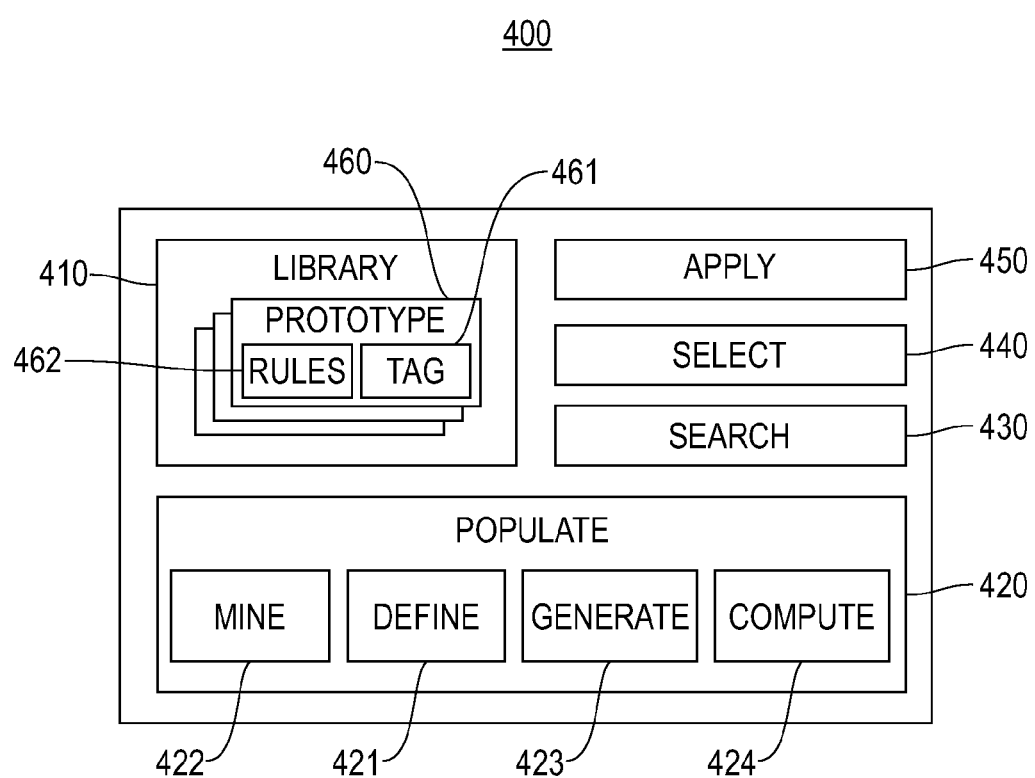
FIG. 7 is a high-level block diagram illustrating a framework for program composition, in accordance with an embodiment of the invention.

FIG. 7 is a high-level block diagram illustrating a framework 400 for program composition, in accordance with an embodiment of the invention. The framework 400 identifies commonly used structures by identifying structures recurring across multiple programs. The framework 400 generalizes and represents the recurring structures as compositional prototypes 460. A compositional prototype 460 may operate on different abstractions of neurosynaptic programs. Each compositional prototype 460 may be used to give rise to multiple instances of a recurring structure, thereby enabling efficient program composition.

The framework 400 includes a library unit 410 and a populate unit 420. The populate unit 420 is configured to identify one or more recurring structures. For each recurring structure identified, the populate unit 420 generates a corresponding compositional prototype 460. The populate unit 420 may generate a compositional prototype 460 in many ways. For example, a compositional prototype 460 may be predefined using a define unit 421, mined using a mine unit 422, generated programmatically using a generate unit 423, or computed parametrically using a compute unit 424.

Each compositional prototype 460 includes at least one corresponding tag 461 and a corresponding set of rules 462. A tag 461 includes metadata information relating to a corresponding compositional prototype 460, such as applications, functions, coding schemes, etc. The populate unit 420 tags each compositional prototype generated with one or more corresponding tags 461. In one embodiment, the tags 461 may be based on user input. In another embodiment, the tags 461 may be automatically generated. Each compositional prototype generated is then maintained in the library unit 410.

The framework 400 further comprises a search unit 430, a select unit 440 and an apply unit 450. The search unit 430 facilitates searching the library unit 410 for compositional prototypes by tags. Compositional prototypes with tags matching those searched may be selected using the select unit 440. The apply unit 450 applies a selected compositional prototype, or rules included therein, to generate or extend a neuromorphic network.

There are at least three different classes of compositional prototypes: network connectivity permutations, core prototypes, and corelet compositional prototypes.

Connectivity between multiple corelets 200 may be complex as many factors must be taken into account, such as properties of the corelets, composition of the corelets, and the manner the corelets are being used within a neuromorphic network. As such, each input connector 50, output connector 60 for each corelet 200 may require a reordering of dimensions and pins. The populate unit 420 may generate reusable network connectivity permutations that are applicable to different corelets 200. The framework 400 enables efficient representation, creation and sharing of different network connectivity permutations among different corelet developers/programmers. The library unit 410 may include one or more general-purpose network connectivity permutations (e.g., two dimensional image connectivity patterns) and one or more specific-purpose network connectivity permutations (e.g., sub-sampling a feature vector). Providing a library of reusable network connectivity permutations may increase code reuse, decrease development time of complex corelet systems, and increase productivity of developers/programmers. Further, reusing a tested network connectivity permutation increases network composition accuracy and decreases debugging time.

FIG. 8 illustrates an example network connectivity permutation, in accordance with an embodiment of the invention. In this specification, let S denote a set of sources, and let T denote a set of targets. A network connectivity permutation may be applied to interconnect the set of sources S to the set of targets T, wherein each source in S is connected to at most one target in T, and wherein each target in T receives from at most one source in S.

In this specification, let P denote a permutation vector that defines a network connectivity permutation. Therefore, T=P(S), wherein $T_j$=P($S_i$) implies that a target $T_j$ in T is connected to source $S_i$ in S.

For example, as shown in FIG. 8, the set of sources S may include a first set of connector pins 70, such as connector pins $S_1$, $S_2$, ..., and $S_7$. The set of targets T may include a second set of connector pins 70, such as connector pins $T_1$, $T_2$, ..., and $T_7$. The permutation vector P=[5, 0, 3, 1, 0, 6, 4] defines a network connectivity permutation that interconnects connector pin $T_1$ to connector pin $S_5$, connector pin $T_3$ to connector pin $S_3$, connector pin $T_4$ to connector pin $S_1$, connector pin $T_6$ to connector pin $S_6$, and connector pin $T_7$ to connector pin $S_4$. The network connectivity permutation applied is only a partial permutation because, as shown in FIG. 8, not all connector pins are connected—the connector pins $S_1$, $S_3$, $S_4$, $S_5$, $S_6$, $T_1$, $T_3$, $T_4$, $T_6$ and $T_7$ are connected pins 70C, whereas the connector pins $S_2$, $S_7$, $T_2$ and $T_5$ are disconnected pins 70D.

For example, in a corelet programming environment, a network connectivity permutation may be applied to a connector of a corelet 200 via an adapter of the connector. The connector may have multiple network connectivity permutations. Each network connectivity permutation addresses a different need, and may be connected by different users (e.g., a corelet composer, a user of the corelet, etc.). One network connectivity permutation may be associated with a first side (e.g., left-hand side) of the connector, and a different network connectivity permutation may be associated with a second side (e.g., right-hand side) of the connector. For example, T.busFrom(S,P) or S.busTo(T,$P^{-1}$), wherein $P^{-1}$ is an inverse permutation of P.

As another example, a connector of a corelet may include one or more internal permutation vectors. The permutation vectors may be set by a programmer or a user of the corelet/connector.

In another embodiment, a network connectivity permutation may be mined (e.g., using a mine unit 422, as described in detail later herein).

In yet another embodiment, a network connectivity permutation can be generated programmatically based on the properties of a corelet 200. For example, a corelet 200 receiving an image of size n×m pixels would have a connector of size nm. A common network connectivity pattern applied to an image is transpose, wherein image dimensions of the image are transposed.

For example, a 4×6 image may be represented by matrix A provided below:

$$A = \begin{vmatrix} 1 & 2 & 3 & 4 & 5 & 6 \\ 7 & 8 & 9 & 10 & 11 & 12 \\ 13 & 14 & 15 & 16 & 17 & 18 \\ 19 & 20 & 21 & 22 & 23 & 24 \end{vmatrix}$$

The resulting 6×4 transposed image may be represented by matrix B provided below:

$$B = \begin{vmatrix} 1 & 7 & 13 & 19 \\ 2 & 8 & 14 & 20 \\ 3 & 9 & 15 & 21 \\ 4 & 10 & 16 & 22 \\ 5 & 11 & 17 & 23 \\ 6 & 12 & 18 & 24 \end{vmatrix}$$

A network connectivity permutation for transposing the image is defined by the permutation vector P provided below:

$$P = \text{reshape}(mapbox(4, 6, 4, 6, 1, 1, 1)', 1, [])$$
$$= [1, 5, 9, 13, 17, 21, 2, 6, 10, 14,$$
$$18, 22, 3, 7, 11, 15, 19, 23, 4, 8, 12, 16, 20, 24]$$

Figure 9:
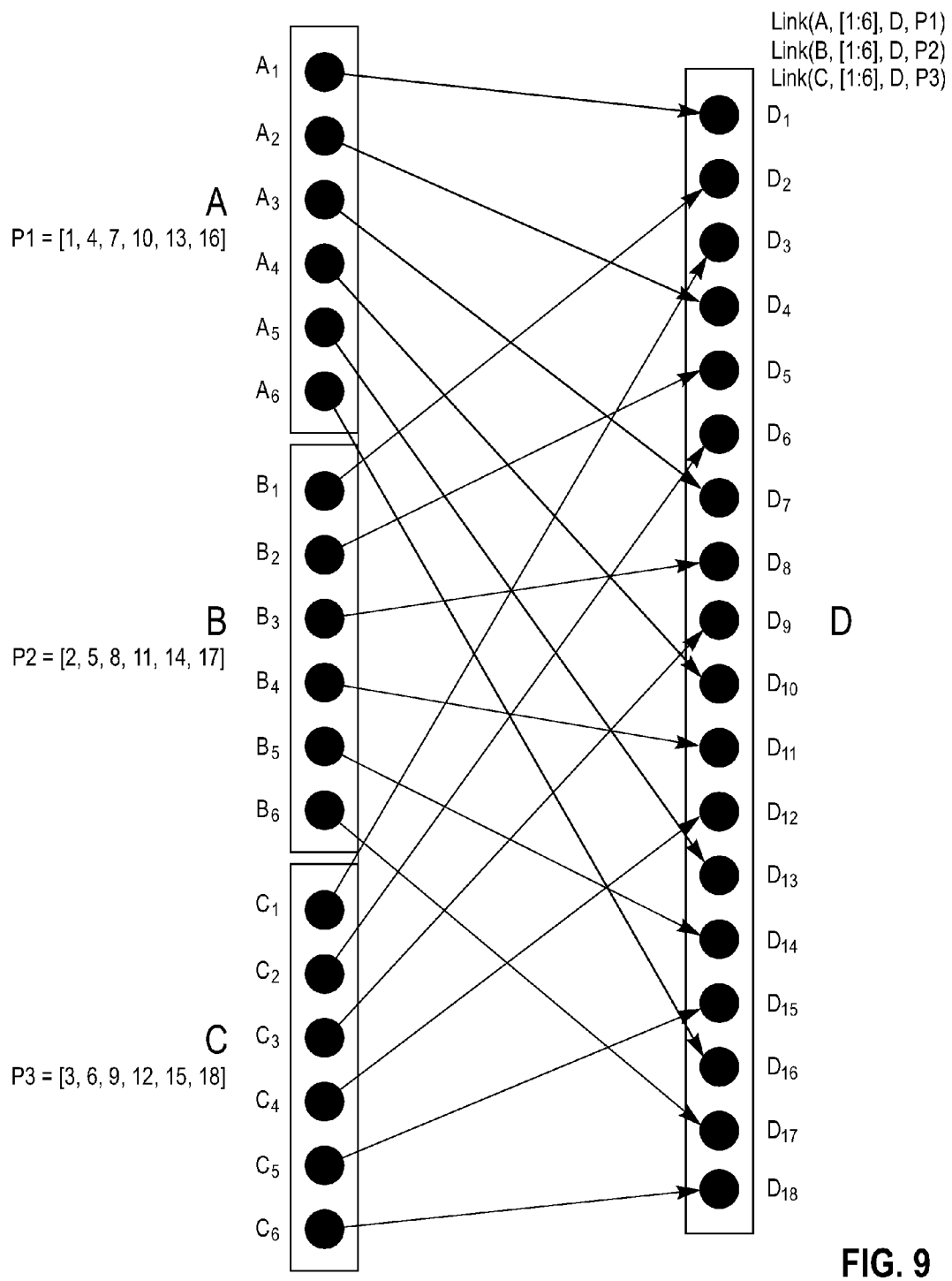
FIG. 9 illustrates another example network connectivity permutation, in accordance with an embodiment of the invention.

FIG. 9 illustrates another example network connectivity permutation, in accordance with an embodiment of the invention. When more than one source and one target connectors are connected together, the pin assignments can be described by an array of permutations, one permutation between each source connector to each target connector. When multiple target connectors are present they can be concatenated into a single row with length equal to the sum of the lengths of the target connectors.

In one embodiment, with a current connector class, apply a link( ) command for each permutation (e.g., link(A, [1,3,4], D, [1,7,6])). In another embodiment, a general-purpose array form may be used.

Usage examples for a network connectivity permutation with many-to-many connectors include: collecting the outputs of multiple filters into one grid of feature vectors, a tiling corelet that takes a corelet with a two-dimensional input and a two-dimensional output connectors, and replicates it on a grid (of tiles), thereby concatenating the tiles' input connectors into one large input and, similarly, combining all the outputs into one large output. The tiling corelet implements a one-to-many permutation pattern from the large input to the inputs of the individual tiles. It also implements a many-to-one permutation, from all the tiles' outputs to the large output connector.

For example, a multi-connector network connectivity permutation shown in FIG. 9 interleaves three vectors into one input. A first connector A includes a first set of connector pins 70, such as connector pins $A_1, A_2, \ldots,$ and $A_6$. A second connector B includes a second set of connector pins 70, such as connector pins $B_1, B_2, \ldots,$ and $B_6$. A third connector C includes a third set of connector pins 70, such as connector pins $C_1, C_2, \ldots,$ and $C_6$. A fourth connector D includes a fourth set of connector pins 70, such as connector pins $D_1, D_2, \ldots,$ and $D_{18}$.

A first permutation vector P1, a second permutation vector P2, and a third permutation vector P3 are used to link the connector pins 70 between the multiple connectors A, B, C and D. Specifically, the first permutation vector P1=[1, 4, 7, 10, 13, 16] defines a network connectivity permutation that interconnects connector pin $A_1$ to connector pin $D_1$, connector pin $A_2$ to connector pin $D_4$, connector pin $A_3$ to connector pin $D_7$, connector pin $A_4$ to connector pin $D_{10}$, connector pin $A_5$ to connector pin $D_{13}$, and connector pin $A_6$ to connector pin $D_{16}$. The second permutation vector P2=[2, 5, 8, 11, 14, 17] defines a network connectivity permutation that interconnects connector pin $B_1$ to connector pin $D_2$, connector pin $B_2$ to connector pin $D_5$, connector pin $B_3$ to connector pin $D_8$, connector pin $B_4$ to connector pin $D_{11}$, connector pin $B_5$ to connector pin $D_{14}$, and connector pin $B_6$ to connector pin $D_{17}$. The third permutation vector P3=[3, 6, 9, 12, 15, 18] defines a network connectivity permutation that interconnects connector pin $C_1$ to connector pin $D_3$, connector pin $C_2$ to connector pin $D_6$, connector pin $C_3$ to connector pin $D_9$, connector pin $C_4$ to connector pin $D_{12}$, connector pin $C_5$ to connector pin $D_{15}$, and connector pin $C_6$ to connector pin $D_{18}$.

Figure 10:
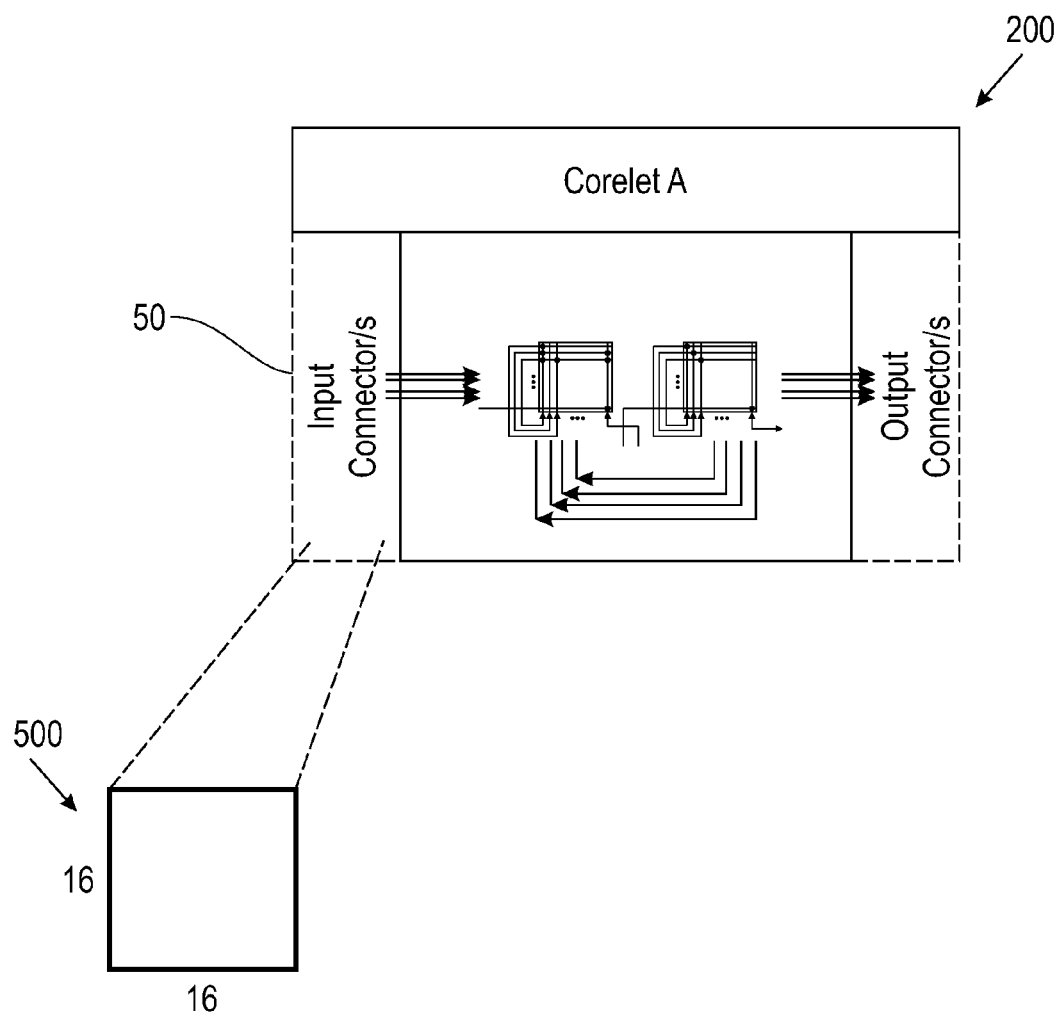
FIG. 10 illustrates an example two-dimensional region of an input connector of a corelet, in accordance with an embodiment of the invention.

FIG. 10 illustrates an example two-dimensional region 500 of an input connector 50 of a corelet 200, in accordance with an embodiment of the invention. In one embodiment, the region 500 is a two-dimensional array that reflects dimensionality of the input connector 50. For example, as shown in FIG. 10, the region 500 may be a 16×16 array that corresponds to a patch of adjacent pixels in an input image. Signals from the input connector 50 are distributed internally to interconnected core circuits 10 of the corelet 200.

Figure 11:
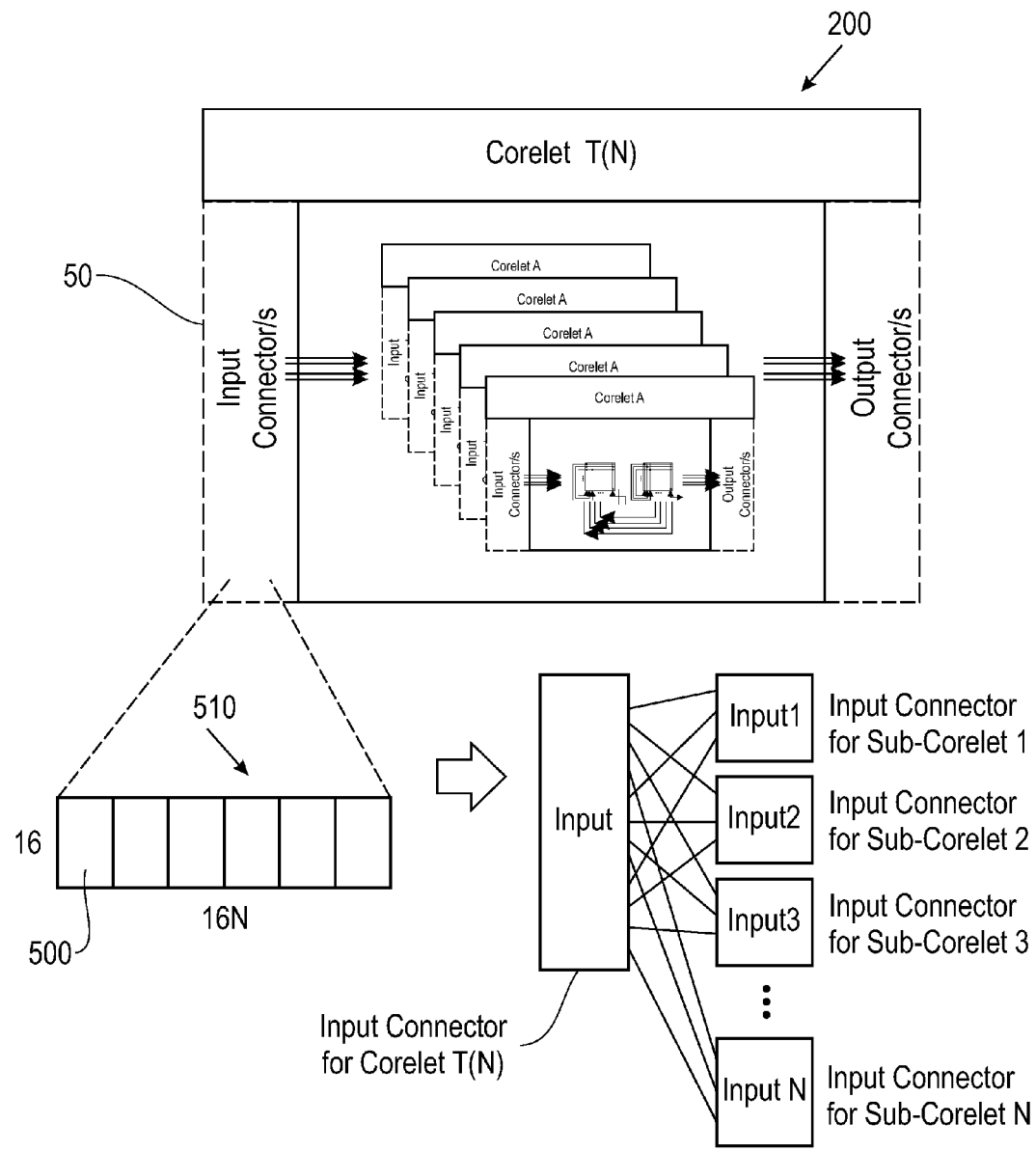
FIG. 11 illustrates another example two-dimensional region of an input connector of a corelet, in accordance with an embodiment of the invention.

FIG. 11 illustrates another example two-dimensional region 510 of an input connector 50 of a corelet 200, in accordance with an embodiment of the invention. In one embodiment, the region 510 is a row of multiple two-dimensional arrays 500, wherein each two-dimensional array 500 reflects dimensionality of an input connector 50 of a sub-corelet within the corelet 200. For example, Corelet T(N) shown in FIG. 11 is a corelet 200 comprising N sub-corelets. The region 510 may be a row of N 16×16 arrays, wherein each 16×16 array reflects dimensionality of an input connector 50 of a sub-corelet within the Corelet T(N). Signals from the input connector 50 of the Corelet T(N) are de-interleaved and distributed internally to the input connectors 50 of the sub-corelets within the Corelet T(N) based on a connectivity permutation. The recurring nature of such connectivity permutations may form the basis for a compositional prototype, in accordance with an embodiment of the invention.

Figure 12:
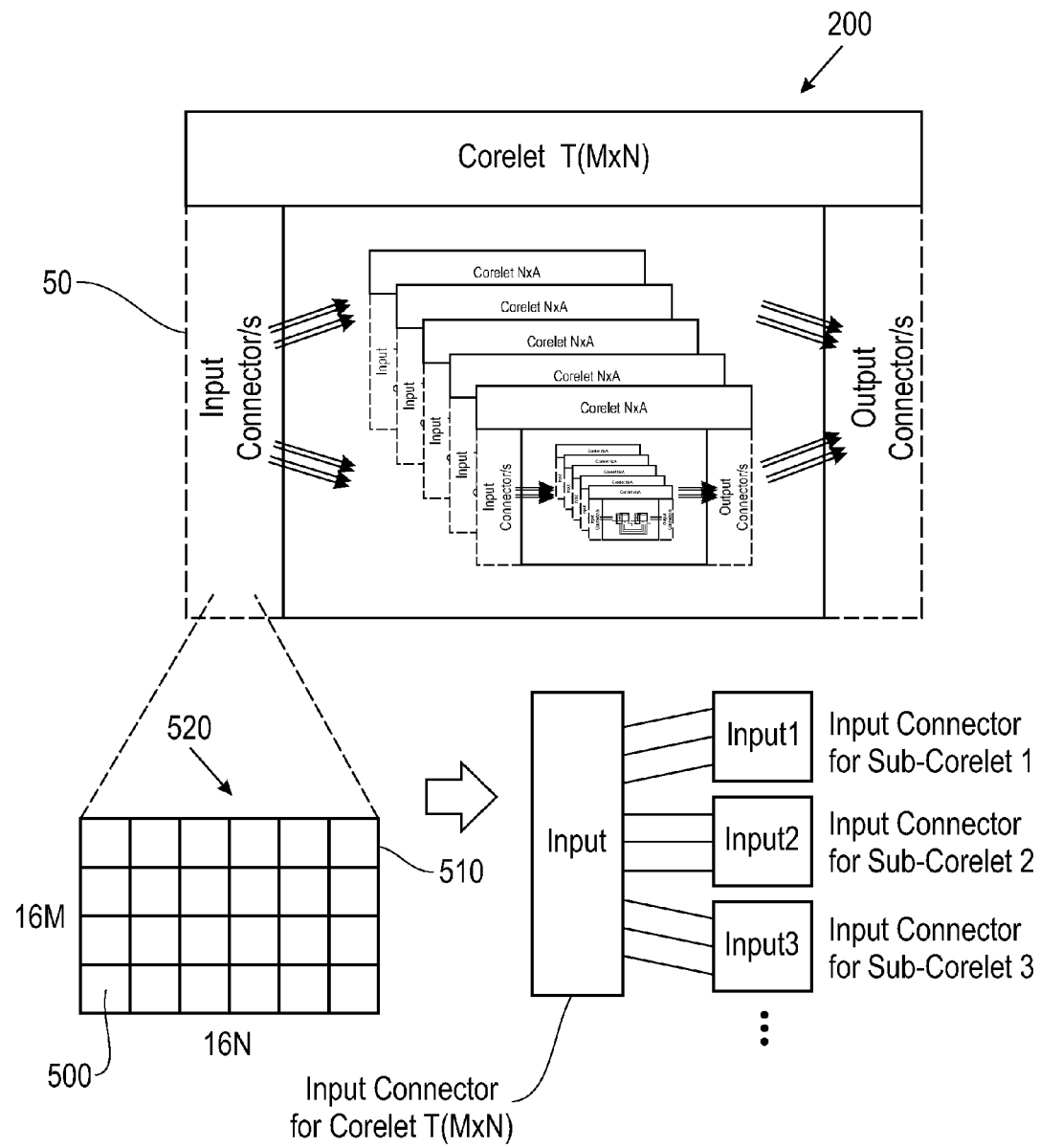
FIG. 12 illustrates another example two-dimensional region of an input connector of a corelet, in accordance with an embodiment of the invention.

FIG. 12 illustrates another example two-dimensional region 520 of an input connector 50 of a corelet 200, in accordance with an embodiment of the invention. In one embodiment, the region 520 is a column comprising multiple rows 510 of multiple two-dimensional arrays 500, wherein each row 510 reflects dimensionality of an input connector 50 of a sub-corelet within the corelet 200, and wherein each two-dimensional array 500 of the row 510 in turn reflects dimensionality of an input connector 50 of a sub-corelet within the sub-corelet 200. For example, Corelet T(M×N) shown in FIG. 12 is a corelet 200 comprising M sub-corelets, wherein each sub-corelet is a Corelet T(N). The region 520 may be a column comprising M rows 510 of N 16×16 arrays, wherein each row 510 reflects dimensionality of an input connector 50 of a Corelet T(N) within the Corelet T(M×N), and wherein each 16×16 array of the row 510 reflects dimensionality of an input connector 50 of a sub-corelet within the Corelet T(N). Signals from the input connector 50 of the Corelet T(M×N) are de-concatenated and distributed internally to the input connectors 50 of the Corelets T(N) within the Corelet T(M×N) based on a connectivity permutation. The recurring nature of such connectivity permutations may form the basis for a compositional prototype, in accordance with an embodiment of the invention.

In one embodiment, a network connectivity permutation may be stored in the library unit 410 as one of the following: a vector of connector pin numbers implemented as a lookup table, a hash map of connector pins, stochastic connectivity properties, or a function call with parameters. The network connectivity permutation may be added with one or more tags, such as dimensionality (e.g., 1D, 2D, 3D, etc.), permutation name (e.g., transpose, reverse, interleave, etc.), source and target corelets 200 it interconnects, and parameters defined programmatically.

When two connectors are provided as search parameters, the search unit 430 searches the library 410 for network connectivity permutations based on the properties of the connectors. When two corelets 200 are provided as search parameters, the search unit 430 searches the library 410 for network connectivity permutations based on the corelets 200 and corresponding parameters. A network connectivity permutation matching the search parameters may include a set of rules 462. The apply unit 450 applies the network connectivity permutation by evaluating the rules to instantiate a connection between the two connectors.

In one embodiment, connectivity between two connectors is bidirectional. Two different network connectivity permutations, one for each direction, may be applied to a connection between the two connectors.

In one embodiment, connectivity between two connectors may change over time, for example, based on one or more learning rules. A connectivity permutation may include a set of learning rules to be applied to a connection between the two connectors.

Figure 13:
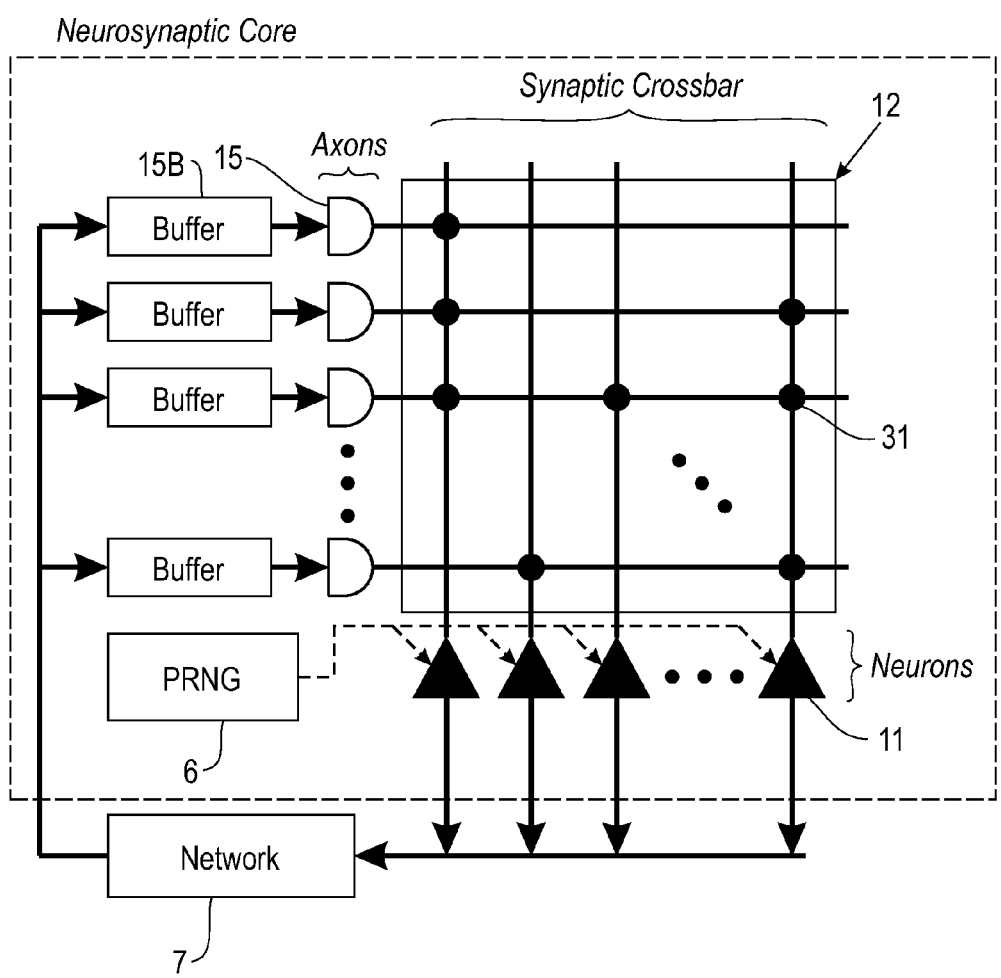
FIG. 13 illustrates an example neurosynaptic core, in accordance with an embodiment of the invention.

FIG. 13 illustrates an example neurosynaptic core 600, in accordance with an embodiment of the invention. A core 600 is a substrate upon which many circuits can be programmed. A particular configuration of a core 600 in any given instance reflects a specific neurosynaptic program instantiated in a core circuit 10. The core 600 comprises a plurality of neurons 11 and a plurality of axons 15. The neurons 11 and the axons 15 are interconnected via a two-dimensional crossbar 12 comprising multiple synapses 31. The core 600 further comprises multiple axon buffers 15B. Each axon buffer 15B receives firing events and transmits them to target axons 15. The core circuit 600 further comprises a pseudo-random number generator 6 used for implementing stochastic mode in each neuron 11.

As shown in FIG. 13, the core circuit 10 is connected to a network interface 7 that facilitates routing of neuronal firing events.

A crossbar prototype represents a pattern of synaptic connectivity within a core circuit 10. A crossbar prototype may be of a variable size. In one embodiment, a crossbar prototype may represent a 256×256 crossbar 12, a smaller, partial crossbar 12, or a larger crossbar 12.

A core prototype represents a pattern of synaptic connectivity within a core circuit 10 as well as additional information, such as neuron types, axon types and other core circuit properties for the core circuit 10. For example, a core prototype may include one or more of the following: a binary or weighted synaptic matrix, a vector of neuron properties, a vector of axon properties, etc.

Utilizing core prototypes saves computational resources, reduces memory needs through sharing one prototype between multiple core instances, provides more legible and/or compact code, reduces chances of error, facilitates code reuse, and reduces model file size by using core prototypes within a model file.

FIG. 14 illustrates an example crossbar 12, in accordance with an embodiment of the invention. Different portions of the crossbar 12 may be programmed with different synaptic weights, such as synaptic weights $SW_0$, $SW_1$, $SW_2$, $SW_3$, and $SW_4$. In one embodiment, different synaptic weights may be achieved with a binary crossbar in conjunction with different axon types.

The mine unit 422 may automatically detects core prototypes in many ways. For example, the mine unit 422 may analyze model files or graph models in memory. Each core circuit 10, or a fraction of a core circuit 10, is assigned with a corresponding hash key. Identical core circuits 10 are found by counting the repetitions of the unique hash keys. Multiple instances of the same core pattern are then replaced with a single core prototype.

As another example, the mine unit 422 may associate core patterns with the parametric call to the function or corelet 200 which generated them. For example, every instantiation of a corelet 200 with the same input parameters would result in the creation of the same core circuits 10 and crossbars 12. Therefore, these core circuits 10 may be saved as patterns with the associated corelet call. For example, a splitter corelet core may be saved as "splitter_corelet(256,4)-core#1". As another example, a convolution kernel core may be saved as "CNVkernel([1 1 1; 0 0 0; −1 −1 −1])-core#1".

A core prototype may be represented and stored as one of the following: a matrix of binary synapses, a matrix of synaptic weights, a hash map of x-y connections (a sparse matrix), stochastic connectivity properties (e.g., a matrix of probability of connectivity), a function call, with parameters, vectors of axon properties and/or neuron properties. A core prototype may be tagged with one or more of the following: density, degree of connectivity, axon and neuron utilization ratios, static properties of the crossbar matrix (e.g., Toeplitz, Positive, Block-Diagonal, Hadamard, etc.), dynamic properties (e.g., coding schemas, expected firing rate for given input rates, etc.), core labels (e.g., splitter, adder, liquid state machine, etc.), textual description of the core function and usage (e.g., a 3×3 filter for a 16×16 input image), corelets it belongs to (multiple labels), method and parameters, for example when a crossbar is defined programmatically.

The search unit 430 searches the library unit 410 for core prototypes based on labels, text, and/or tags. The apply unit

450 generates a core instance for a core prototype matching the search parameters provided, and returns a reference to the core instance.

A corelet compositional prototype (CCP) is represented by one or more corelets and network connectivity between the corelets. It may be a part of an application, a corelet system, or a sub-network of a larger corelet. The populate unit 420 associates a corelet C in a collection of corelets with one or more defined corelet functionalities. The corelet C is tagged with associated corelet functionalities. The populate unit 420 identifies different corelet compositional prototypes containing two or more corelets $C_i$ and $C_j$. The compositional prototypes characterize the way $C_i$ and $C_j$ are composed. The populate unit 420 generalizes the compositional prototypes to other corelets of similar functionality, and stores the compositional prototypes along with the associated corelets in the library unit 410. A compositional prototype may be generalized and repeated for corelet instantiation and composition, to create larger neuromorphic systems.

Available corelet functionalities may include mathematical functions (e.g., Boolean operators, logical functions, control logic), signal processing functions (e.g., FFT/DFT, filter operations such as Gaussian pyramid, convolution filters, 1D spatial filters, 2D spatial filters, and image processing and feature extraction operations such as color histogram, multi-scale image processing, saliency, and True-North transform), routing corelets (e.g., 1D routers, 2D routers), decision and control (e.g., Finite State Machine, Kalman Filter), topological functions (e.g., splitter, merger, Winner Takes All), classifiers (e.g., support vector machine (SVM), stackable classifier, convolution network), video processing (e.g., spatio-temporal filters, motion history, optical flow), dimensionality (e.g., 1D, 2D), spike coding schema (e.g., rate code, binary code, burst-length code, time-to-spike code, etc.), stochasticity (e.g., non-stochastic, stochastic neurons, stochastic synapses, pseudo-random crossbars, etc.), and learnability (e.g., programmable, adaptive, trainable).

A CCP may be stored as in the library unit 410 as one of the following: an instance of a corresponding corelet 200 with associated parameters and connectivity patterns, one or more sub-corelets 210, a function call with associated parameters, a model file representing a sub-network that can be linked with other sub-networks. The CCP may be tagged with one or more of the following tags: a name of a corresponding corelet, a corelet functionality, an application, textual description for the corelet, information relating to one or more input connectors and one or more output connectors for the corelet, usage information, static properties (e.g., corelet parameters, corelet size, statistics of core utilization, power consumption), dynamic properties (e.g., coding schemas, expected firing rate (for given input rates), frame/non-frame based processing, reset requirements, learning-based, etc.), stochastic properties (e.g., random networks, pseudo-random connectivity, graph properties), parent corelets 200 the CCP has been composed/used in (multiple labels), methods and parameters commonly used by the corelets.

The search unit 430 searches the library unit 410 for CCPs based search parameters such as application, functionality, text, etc. The resulting search results may be filtered by combining other tags. Based upon rules included in a CCP matching the search parameters, the apply unit 450 is configured to perform at least one of the following: (1) given one or more of the CCP's corelets, create remaining corelets in the CCP and connect them to make a larger network, (2) given one or more of the CCP's corelets, link with one or more model files of the remaining corelets in the CCP, (3) check coding schemas of associated corelets and adding one or more transducer corelets, described below, as needed, and (4) check connectivity order and add one or more permutations as needed.

Figure 15:
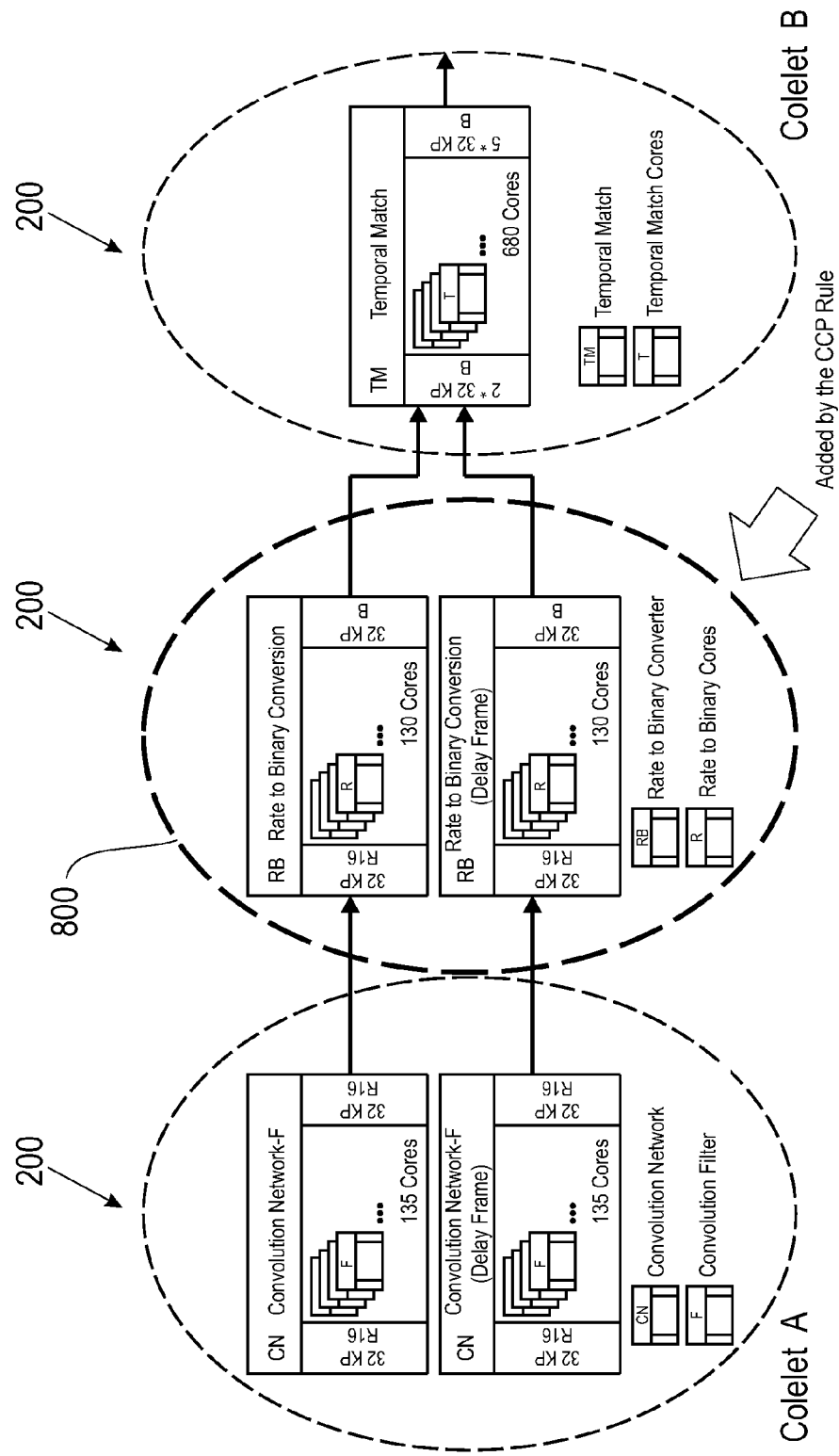
FIG. 15 illustrate adding an example transducer corelet, in accordance with an embodiment of the invention.

FIG. 15 is an example transducer corelet, in accordance with an embodiment of the invention. As shown in FIG. 15, to connect a first corelet 200 (Corelet A) and a second corelet 200 (Corelet B) operating in different spike coding schemas, a transducer corelet 800 is added between the two corelets 200. The transducer corelet 800 is a corelet 200 that functions as an intermediary bridge between the first corelet 200 and the second corelet 200, converting spikes/firing events from the output coding schema of the first corelet 200 to the required input coding schema and input pin configuration of the second corelet 200.

When the first corelet 200 and the second corelet 200 are provided as search parameters to the search unit 430, the search unit 430 returns a CCP matching the properties of the first corelet 200 and the second corelet 200. The CCP includes a rule to add a transducer corelet 800 between the two corelets 200. When the apply unit 450 applies the rule, the transducer corelet 800 is instantiated and connected, thereby facilitating composition of the first corelet 200 and the second corelet 200.

Figure 16:
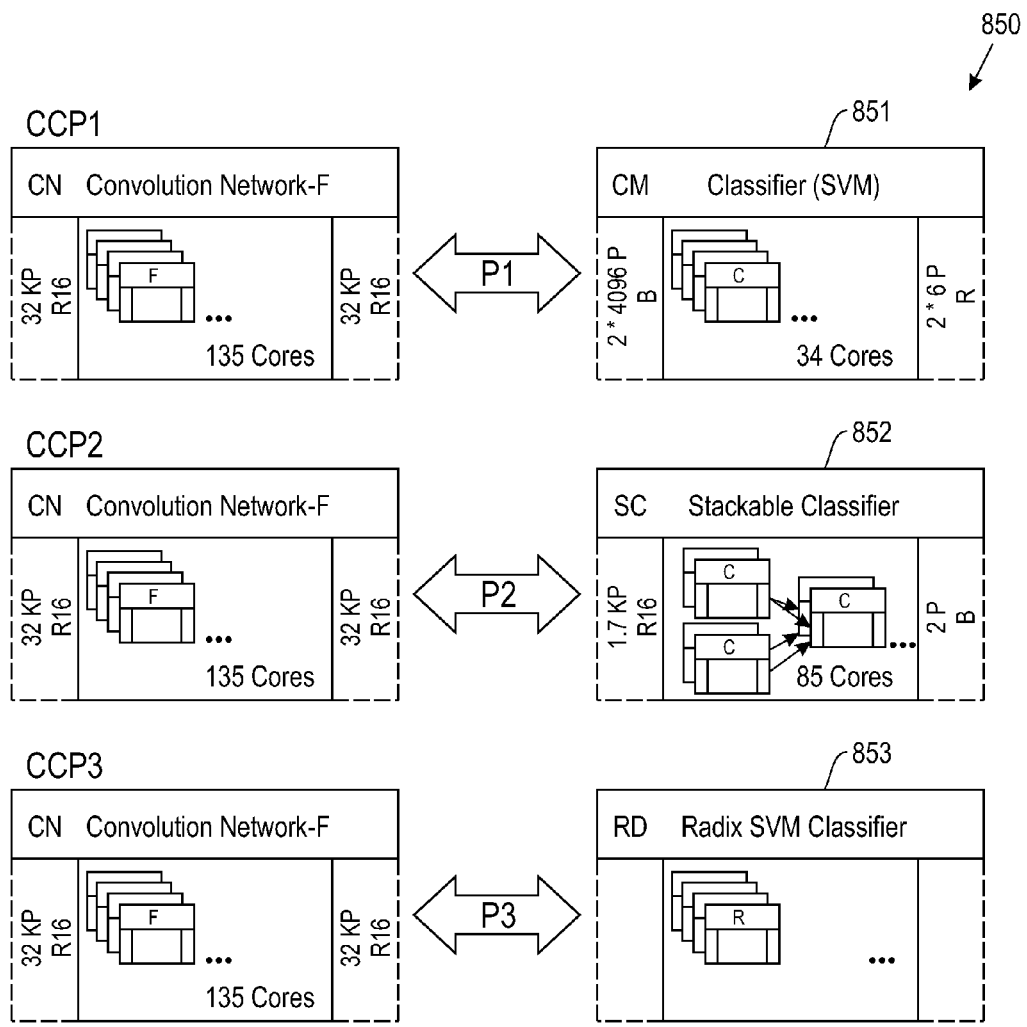
FIG. 16 illustrates multiple example corelet compositional prototypes (CCPs), each CCP having a Convolution Network as a common component, in accordance with an embodiment of the invention.

FIG. 16 illustrates multiple example corelet compositional prototypes (CCPs), each CCP having a Convolution Network as a common component. In one embodiment, when the library unit 410 is queried for CCPs containing a classifier suitable for a specified convolution network corelet 200 representing a feature extractor, the search unit 430 returns multiple CCPs for user selection, such as a first CCP (CCP1), a second CCP (CCP2) and a third CCP (CCP3). Each CCP returned is a corelet 200 that connects the convolution network corelet 200 to different classifier corelets 850. A user may select, via the select unit 440, which one of the CCPs returned to apply. For example, applying a rule of the first CCP generates a SVM classifier 851 and connects the convolution network corelet 200 to the SVM classifier 851 using a first permutation P1. Applying a rule of the second CCP generates a stackable classifier 852 and connects the convolution network corelet 200 to the stackable classifier 852 using a second permutation P2. Applying a rule of the third CCP generates a radix SVM classifier 853 and connects the convolution network corelet 200 to the radix SVM classifier 853 using a third permutation P3. A transducer corelet 800 may also be used to connect the convolution network corelet 200 to a classifier corelet 850.

Similarly, if a user queries for a classifier corelet 850, a CCP that includes a rule to use a convolution network corelet 200 as a feature extractor may be returned.

Figure 17:
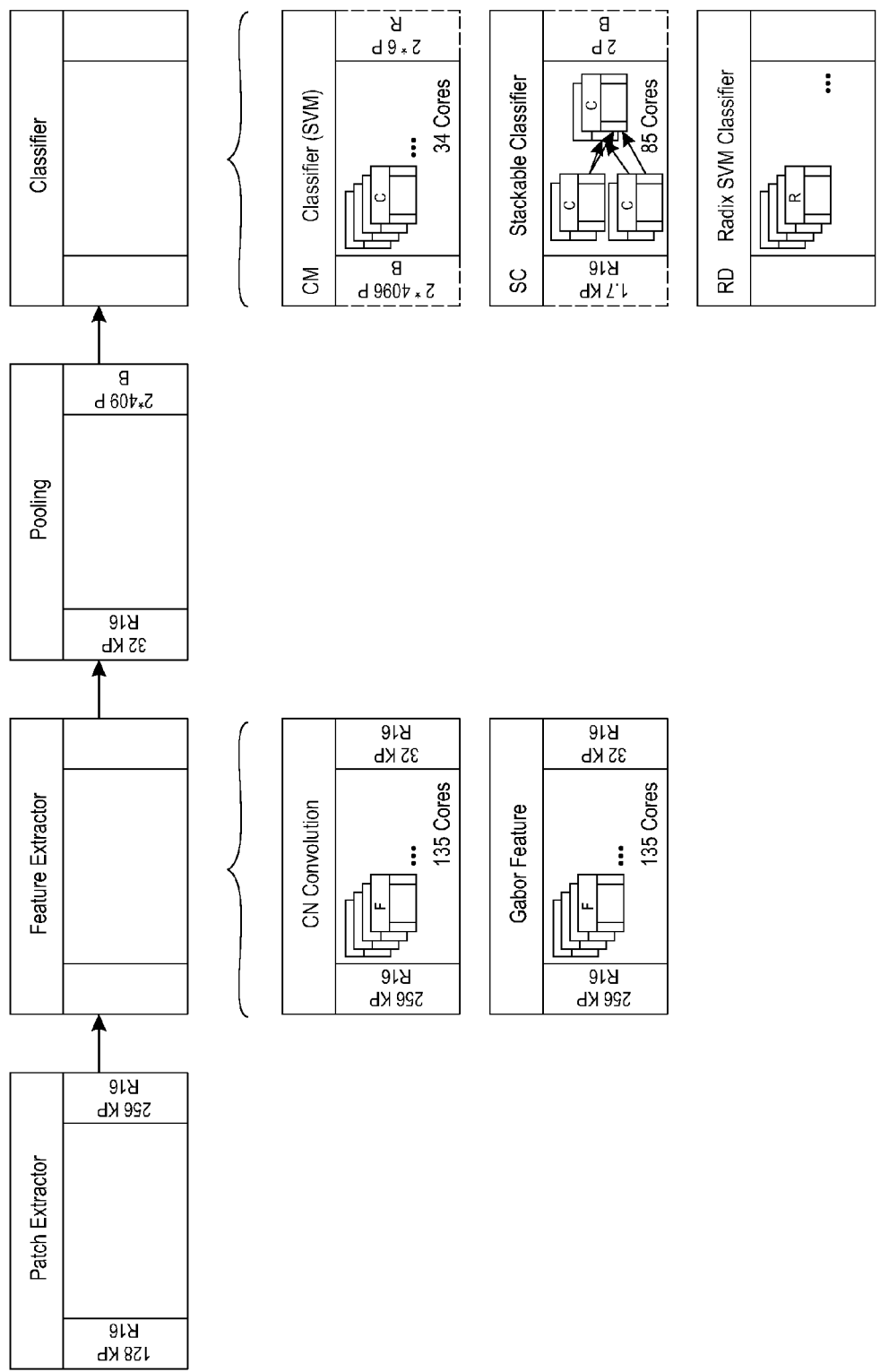
FIG. 17 illustrates an example application-specific search, in accordance with an embodiment of the invention.

FIG. 17 illustrates an example application-specific search, in accordance with an embodiment of the invention. The library unit 410 may further include application sub-systems and complete application systems for specific applications. An application system may comprise multiple components. Each component may have one or more alternative corelets, as shown in FIG. 17. Multiple choices drawn from the library unit 410 may be presented for user selection. For example, when a user selects a feature extractor, appropriate connectivity is generated, and classifiers suitable for the selected feature extractor are presented for user selection.

Figure 18:
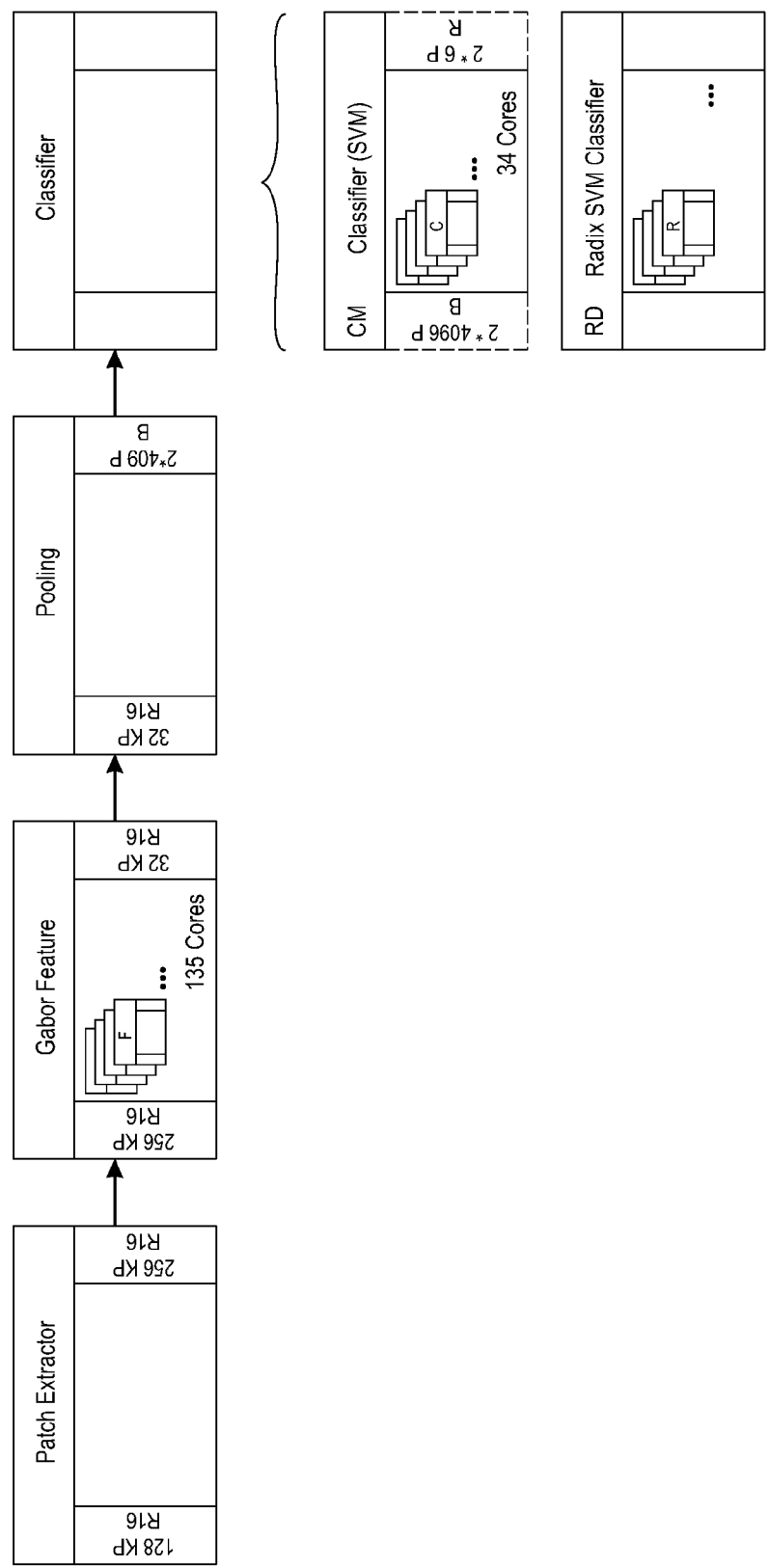
FIG. 18 illustrates an example application of a rule, in accordance with an embodiment of the invention.

FIG. 18 illustrates an example application of a rule, in accordance with an embodiment of the invention. Each user selection may invoke one or more rules. A complete system is iteratively generated by applying rules with each user selection. Based on input data, selected corelets 200 and applied connectivity, coding schemas are matched and timing information is propagated and used in the corelets 200.

The framework 400 is scalable and may be utilized in a distributed computation infrastructure. The library unit 410 may be populated automatically using mining of existing corelets 200 and applications.

In a distributed computational environment, corelets 200 can be independently instantiated across multiple hosts. A user selects compositional prototypes from the library unit 410. Composition across corelets on different hosts may be done by exchanging messages across processes using, for example, MPI libraries.

Compositional prototypes and network connectivity permutations may be automatically identified and incorporated into the library unit 410 in various ways. For example, an on-line process includes embedding network generation software with code which records each act of connecting two or more corelets 200 in a database. The database records would identify the two or more corelets 200 and the network connectivity permutation between the corelets 200. The database records may be mined by clustering together database records containing the same pair of corelets 200 and analyzing their connectivity permutations. As another example, an off-line process includes analyzing a set of model files, wherein each model file contains a network with metadata about a pair of corelets. Information relating to connectivity between corelets is extracted from the model file and input/output map files. Connector pins of each connector are then remapped to the neurons and axons based on the information extracted. Upon determining the target axons, associated connectivity between connector pins of the corelets is then determined. A permutation between the pair of corelets may be obtained by listing the connected pin numbers.

Figure 19:
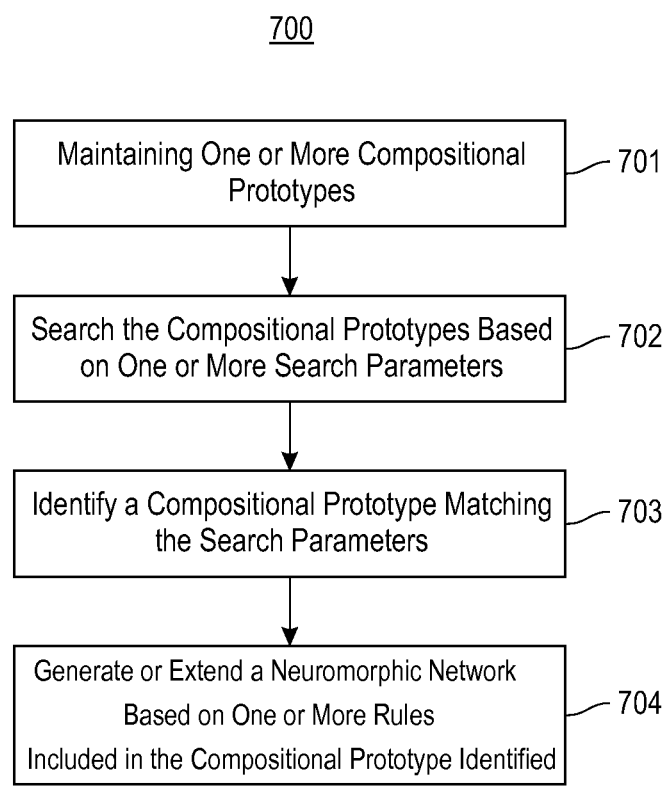
FIG. 19 is an example flowchart for generating or extending a neuromorphic network, in accordance with an embodiment of the invention.

FIG. 19 is an example flowchart 700 for generating or extending a neuromorphic network, in accordance with an embodiment of the invention. In process block 701, one or more compositional prototypes are maintained. In process block 702, the compositional prototypes are searched based on one or more search parameters. In process block 703, a compositional prototype matching the search parameters is identified. In process block 704, generate or extend a neuromorphic network based on one or more rules associated with the compositional prototype identified.

Figure 20:
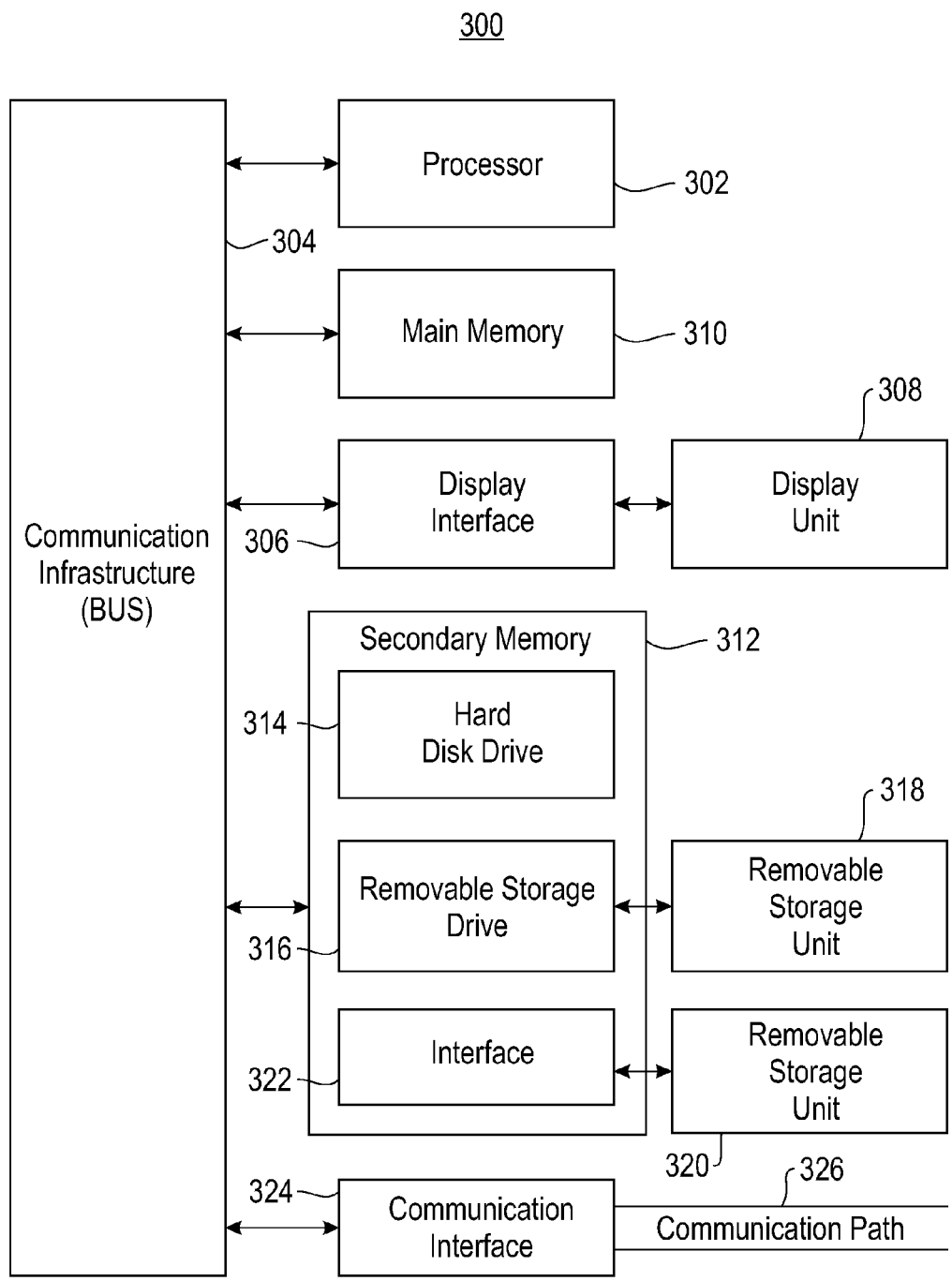
FIG. 20 illustrates a high-level block diagram showing an information processing system useful for implementing one embodiment of the present invention.

FIG. 20 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    identifying one or more structures recurring across multiple model files, wherein each model file comprises information relating to one or more neurosynaptic cores;
    for each recurring structure identified, generating a corresponding reusable compositional prototype, wherein each reusable compositional prototype comprises one or more metadata tags and a set of pre-defined rules, and each rule identifies one or more modifications for a neurosynaptic network;
    maintaining a library including each reusable compositional prototype generated;
    in response to receiving one or more search parameters, searching the library based on the one or more search parameters;
    selecting at least one reusable compositional prototype with at least one metadata tag satisfying the one or more search parameters; and
    instantiating one or more components of the network and connectivity between the one or more components based on one or more rules included in the at least one selected reusable compositional prototype, thereby decreasing time associated with developing and debugging the network and increasing accuracy of the network.

2. The method of claim 1, wherein the one or more rules control one or more of the following: adding a neurosynaptic program to the network, adding a sub-network to the network, adding a connection in the network, adding a neuron in the network, changing one or more parameters of the network, applying a reusable compositional prototype, and enhancing functionality of the network.

3. The method of claim 1, wherein each reusable compositional prototype maintained includes at least one of the following: a corelet prototype, a core prototype, a synaptic crossbar prototype, a network connectivity permutation, and spike coding transcoding.

4. The method of claim 1, wherein the one or more search parameters include at least one of the following: a name of a neurosynaptic program, a core circuit functionality, a network topology, a spike coding scheme, and a network size.

5. The method of claim 1, wherein the one or more search parameters are selected or automatically computed from a given network, and the one or more rules are applied to generate, extend, enhance, or repair the same network.

6. The method of claim 1, wherein:
at least one reusable compositional prototype satisfying the one or more search parameters is selected based on user selection; and
the one or more rules are applied to instantiate one or more neurosynaptic programs for generating or extending the network.

7. The method of claim 1, wherein the one or more neurosynaptic programs are instantiated in a distributed environment.

8. The method of claim 1, wherein the one or more rules include instantiating a transducer corelet to interconnect two neurosynaptic programs operating on different spike coding schemes.

9. The method of claim 1, further comprising:
populating the library by automatically identifying one or more reusable compositional prototypes based on one or more model files.

10. A system comprising:
at least one processor; and
a non-transitory processor-readable memory device storing instructions that when executed by the at least one processor causes the at least one processor to perform operations including:
identifying one or more structures recurring across multiple model files, wherein each model file comprises information relating to one or more neurosynaptic cores;
for each recurring structure identified, generating a corresponding reusable compositional prototype, wherein each reusable compositional prototype comprises one or more metadata tags and a set of pre-defined rules, and each rule identifies one or more modifications for a neurosynaptic network;
maintaining a library including each reusable compositional prototype generated;
in response to receiving one or more search parameters, searching the library based on the one or more search parameters;
selecting at least one reusable compositional prototype with at least one metadata tag satisfying the one or more search parameters; and
instantiating one or more components of the network and connectivity between the one or more components based on one or more rules included in the at least one selected reusable compositional prototype, thereby decreasing time associated with developing and debugging the network and increasing accuracy of the network.

11. The system of claim 10, wherein the operations further comprise:
analyzing one or more model files;
identifying one or more unique core patterns in the one or more model files;
assigning each unique core pattern identified with a corresponding unique identifier; and
for each unique core pattern identified:
locating each instance of the unique core pattern in the one or more model files based on repetitions of a corresponding unique identifier for the unique core pattern; and
replacing each instance located with a reusable compositional prototype corresponding to the unique core pattern;
wherein each unique identifier comprises a hash key.

12. The system of claim 11, wherein each unique core pattern identified relates to one of the following: a neurosynaptic core, a portion of a neurosynaptic core.

13. The system of claim 11, wherein each reusable compositional prototype comprises one of the following: a core prototype, a crossbar prototype.

14. The system of claim 11, wherein the operations further comprise:
associating each unique core pattern identified with a corresponding parametric call to one of a function or a corelet for generating the unique core pattern.

15. The system of claim 11, wherein:
each unique core pattern identified relates to a connectivity permutation between two or more corelets.

16. The system of claim 15, wherein the operations further comprise:
analyzing the one or more model files based on one or more algorithms;
extracting metadata from each model file, wherein metadata extracted from each model file identifies a corelet that generated the model file; and
based on metadata extracted from each model file, determining at least one connectivity permutation.

17. A computer-readable medium storing instructions that, when executed by at least one processor of a machine, cause the machine to perform operations comprising:
identifying one or more structures recurring across multiple model files, wherein each model file comprises information relating to one or more neurosynaptic cores;
for each recurring structure identified, generating a corresponding reusable compositional prototype, wherein each reusable compositional prototype comprises one or more metadata tags and a set of pre-defined rules, and each rule identifies one or more modifications for a neurosynaptic network;
maintaining a library including each reusable compositional prototype generated;
in response to receiving one or more search parameters, searching the library based on the one or more search parameters;
selecting at least one reusable compositional prototype with at least one metadata tag satisfying the one or more search parameters; and
instantiating one or more components of the network and connectivity between the one or more components based on one or more rules included in the at least one selected reusable compositional prototype, thereby decreasing time associated with developing and debugging the network and increasing accuracy of the network.

18. The computer-readable medium of claim 17, wherein the operations further comprise:
providing a programming environment for corelet composition;
recording, utilizing the programming environment, one or more user actions associated with corelet composition;
for each user action recorded, maintaining a corresponding database record including metadata related to the user action; and
clustering database records with similar metadata to identify one or more patterns related to corelet composition;
wherein each pattern identified relates to a connectivity permutation between two or more corelets;
wherein, for each user action recorded, a corresponding database record for the user action includes metadata identifying each of the following: two or more corelets, and a connectivity permutation for connecting the two or more corelets; and
wherein database records with metadata identifying the same corelets are clustered together.

19. The computer-readable medium of claim 17, wherein:
each pattern identified relates to a reusable compositional prototype.

* * * * *